(12) United States Patent
Heaney

(10) Patent No.: US 10,837,575 B2
(45) Date of Patent: Nov. 17, 2020

(54) MAGNETICALLY COUPLED ACTUATOR AND LIMIT SWITCH ASSEMBLY FOR A SEALED CHAMBER SYSTEM

(71) Applicant: John S. Heaney, Providence, RI (US)

(72) Inventor: John S. Heaney, Providence, RI (US)

( * ) Notice: Subject to any disclaimer, the term of this patent is extended or adjusted under 35 U.S.C. 154(b) by 0 days.

(21) Appl. No.: 16/439,768

(22) Filed: Jun. 13, 2019

(65) Prior Publication Data
US 2020/0281136 A1 Sep. 10, 2020

Related U.S. Application Data

(60) Provisional application No. 62/815,726, filed on Mar. 8, 2019.

(51) Int. Cl.
| | |
|---|---|
| *A01G 25/16* | (2006.01) |
| *F16K 31/08* | (2006.01) |
| *A01G 25/09* | (2006.01) |
| *F16H 25/20* | (2006.01) |
| *G05D 16/20* | (2006.01) |
| *H02K 49/10* | (2006.01) |
| *F16K 31/04* | (2006.01) |
| *B05B 12/16* | (2018.01) |
| *B05B 3/04* | (2006.01) |
| *B05B 12/08* | (2006.01) |

(52) U.S. Cl.
CPC ............ *F16K 31/08* (2013.01); *A01G 25/092* (2013.01); *A01G 25/16* (2013.01); *B05B 3/0409* (2013.01); *B05B 3/0422* (2013.01); *B05B 12/087* (2013.01); *B05B 12/16* (2018.02); *F16H 25/2015* (2013.01); *F16K 31/04* (2013.01); *G05D 16/202* (2013.01); *H02K 49/108* (2013.01); *F16H 2025/2071* (2013.01); *F16H 2025/2081* (2013.01)

(58) Field of Classification Search
CPC .......................... H02H 7/0851; E05F 15/1684
See application file for complete search history.

(56) References Cited

U.S. PATENT DOCUMENTS

| | | | | |
|---|---|---|---|---|
| 3,915,383 | A * | 10/1975 | King ...................... | B05B 3/044 239/242 |
| 3,921,912 | A * | 11/1975 | Hayes ...................... | B05B 1/12 239/242 |
| 5,597,119 | A * | 1/1997 | Gorney .................. | B05B 3/0468 239/241 |
| 7,287,710 | B1 * | 10/2007 | Nelson .................... | B05B 3/006 239/222.17 |
| 8,100,141 | B2 * | 1/2012 | Slupecki ............... | F16K 37/005 137/456 |
| 8,426,992 | B2 * | 4/2013 | Baarman ................. | C02F 1/325 290/43 |
| 8,733,672 | B2 * | 5/2014 | Nations ..................... | B05B 3/02 239/240 |

(Continued)

*Primary Examiner* — Rina I Duda
(74) *Attorney, Agent, or Firm* — Barlow, Josephs & Holmes, Ltd.

(57) ABSTRACT

A programmable, electronically controlled sprinkler system has a hermetically sealed internal chamber which encloses all of the internal water flow, valves, mechanical and rotational components and a plurality of magnetic coupling arrangements which allow external motors to control operation of the internal mechanical components without requiring any hydraulic seals.

19 Claims, 17 Drawing Sheets

(56) References Cited

U.S. PATENT DOCUMENTS

| 8,998,109 | B2* | 4/2015 | Katzman | ............... | B05B 3/005 |
| | | | | | 239/252 |
| 2014/0084078 | A1* | 3/2014 | Nelson | .................. | B05B 15/70 |
| | | | | | 239/69 |

* cited by examiner

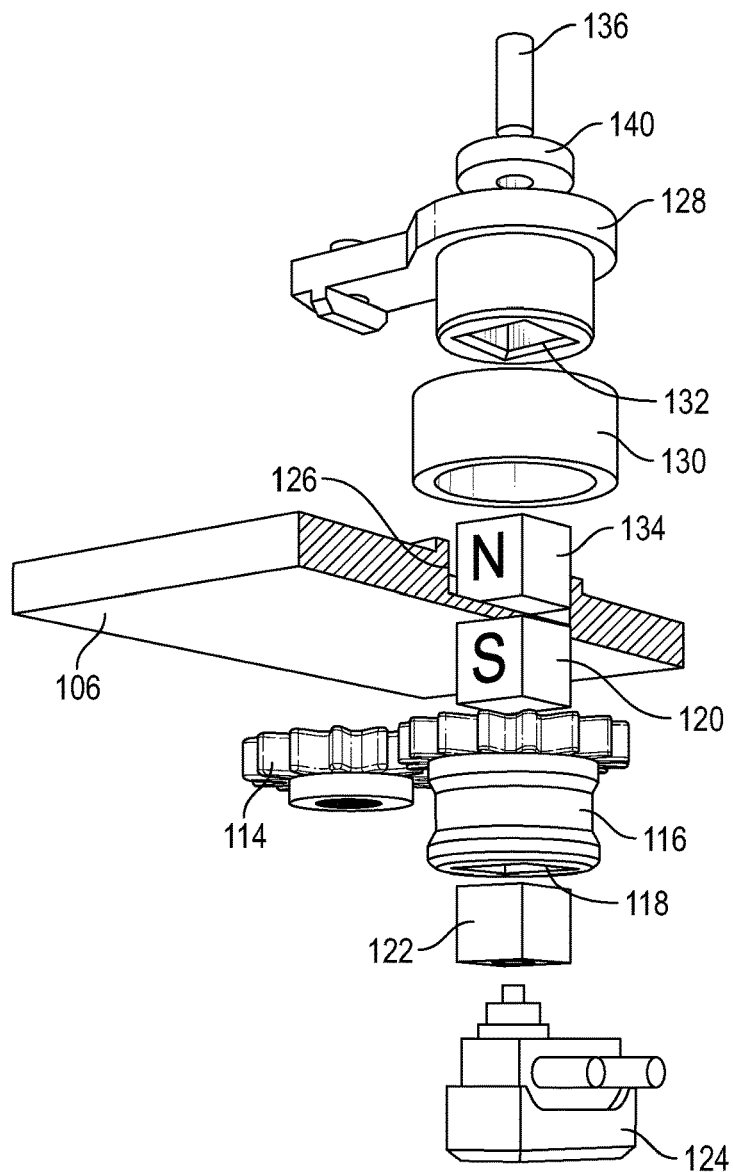
FIG. 9
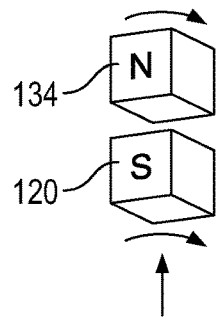
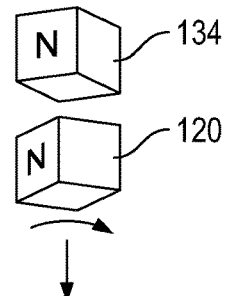
FIG. 10A      FIG. 10B

MAGNETICALLY COUPLED ACTUATOR AND LIMIT SWITCH ASSEMBLY FOR A SEALED CHAMBER SYSTEM

CROSS-REFERENCE TO RELATED APPLICATIONS

The present application claims the benefit of U.S. Provisional Application No. 62/815,726, filed Mar. 8, 2019.

BACKGROUND OF THE DISCLOSURE

Embodiments of the invention relate to water sprinkler systems, and more particularly to programmable electronically controlled sprinkler systems which are controllable to effect sprinkler direction and time of watering.

The design of present sprinkler systems is focused on structure which allows the water to flow through the system and to mechanically rotate the sprinkler head achieving a predefined of coverage pattern. Electronic controls effect the timing of when the sprinklers are turned on and off. Distance or travel of the spray and rotation arcs of prior art systems are typically controlled mechanically with spray nozzle selection and angle, and mechanical rotational limits.

The existing systems are known to have high power requirements which require wired electrical power, are known to be difficult to program and configure for optimal coverage and are further known to waste considerable amounts of water. There is thus a continuing need for improvements in such watering systems.

SUMMARY OF THE INVENTION

A smart sprinkler system in accordance with the present disclosure delivers water from a pressurized water supply to any location within its range via a spray nozzle or sprinkler head that can be rotated in any direction. The distance of the spray field is determined by the water pressure. The term "smart", in the context of the present system, refers to its ability to be controlled wirelessly using a "smart" device, such as a smart phone or tablet that can run an associated application that communicates with the control electronics of the system. Once configured, the sprinkler functionality is controlled by the device autonomously. This division of labor, the sprinkler device performing the functions of the sprinkler and the phone/tablet providing the Graphical User Interface (GUI), leverages the power of a device that is designed specifically for providing rich and familiar user interfaces, while alleviating the cost and complexity of providing a user interface on the sprinkler.

A defining characteristic of the sprinkler system is that it is able to deliver a small footprint of water to a specific location in a reproducible manner. The sprinkler head rotates about a vertical axis, so the specification of a location is represented in polar coordinates as an angle and a pressure, where the pressure is related to the radial distance from the sprinkler head. The area of water striking the ground can best be envisioned as a narrow rectangle or short line segment radial to the nozzle. The orientation of the rectangle lengthwise along the radius is also intentional, as the primary means of distributing the water in a pattern is by sweeping it about an arc. A sprinkler pattern is created as a series of curves, with each curve being defined as a change of pressure and change of rotation angle. Each pressure represents a distance from the sprinkler head. If the pressure is changed, but the rotation angle is not, then the movement would describe a radial line segment emanating from the sprinkler head at the center. If the rotation is changed, but the pressure is not, then the movement describes an arc with a radius proportional to the pressure and endpoints corresponding to the starting and ending angles of rotation. If both the pressure and rotation angles change then the movement describes a curve that approximates an average of two arcs at the two pressures with the same rotational endpoints. These movements effectively amount to vectors described in polar coordinates, where the change in pressure represents the radial component and the change in rotation represents the component along an arc. Note that sufficiently small movements may be used to approximate straight lines. As the sprinkler describes a curve over time, a narrow band of spray is produced along the arc component. A user is able to describe a series of points and curves, which together combine into a predefined area, or watering pattern, as the sprinkler sweeps across between each pair of points in sequence.

It is also a defining characteristic of the sprinkler system that it is able to operate with only a single connection to a water source and does not require a connection to any external power. This allows the present sprinkler system to be a direct replacement for a typical lawn sprinkler, which is mechanically driven entirely by the energy provided by the supply pressure of the water source. Unlike a mechanical lawn sprinkler, which only provides one pressure (that of the supply) and one set of stops and can, therefore, only supply one pattern that is either roughly rectangular or circular (depending on the type), the present sprinkler system can create arbitrarily shaped patterns. It achieves this by using a circular lawn sprinkler mechanism to drive the rotation of the sprinkler head, but with an electric motor to actuate the mechanism that controls the direction of the rotation. Additionally, the present sprinkler system explicitly controls the water pressure delivered to the spray nozzle, up to the maximum of the supply pressure. The system achieves this using an adjustable piloted valve assembly, which maximizes the use of the supplied pressure to affect changes to the valve.

Required electrical energy is harvested from two sources: a hydro generator in line with the water flow between the pressurized supply and the nozzle (input and output, respectively) and a solar panel. Both sources provide DC electricity used to power the electronics that comprise the control system. The hydro generator provides energy while the sprinkler is active (i.e. water is flowing through it) and the solar panel captures energy from the sun, regardless of whether the sprinkler is active. Since the sprinkler is always consuming energy, the power system includes a rechargeable battery and a battery charge controller. Thus, the two power sources are used to power the system. Any energy in excess of the demands of the system is put into the battery. If the system consumes more energy than is supplied by the power sources then the difference is drawn from the battery. The energy system is balanced, such that the battery is never completely drained, requiring no additional power source under normal use.

The electrical components associated with the direct control of the sprinkler system may comprise two low-power DC motors: one for a pressure control valve and the other for a diverter that controls the rotational direction of the spray nozzle. The motors provide the input to magnetic couplings. The valve control motor is used to open and close the piloted valve incrementally and the diverter motor is used to rotate an armature to change the flow path in an oscillator which drives the sprinkler head in either direction or may hold it stationary.

The microcontroller unit (MCU) performs all functions related to the control of the sprinkler system using software stored in non-volatile memory within the MCU itself. The MCU also includes storage, both volatile (RAM) and non-volatile, for storing data associated with the running of the device. The MCU also provides a short-range radio used to provide a wireless interface used by the external smart device to configure and control the sprinkler remotely. The firmware defines and implements a command interface to provide these capabilities. Additionally, the MCU provides timing and counting functions that allow the device to control when it starts or stops. It may be configured to, for example, run a user-defined pattern for a specified duration or to be repeated a specified number of times before shutting itself off.

Accordingly, it can be seen that the present system provides several unique and novel improvement over systems of the prior art, particularly with respect to sealed chamber magnetic couplers which eliminate the need for high friction seals for rotating parts and which also reduce power needs for rotating components within the sealed chambers.

BRIEF DESCRIPTION OF THE DRAWINGS

Various embodiments of the present invention can be more readily understood and appreciated by one of ordinary skill in the art from the following descriptions of various embodiments of the invention when read in conjunction with the accompanying drawings in which:

FIG. 9 is an exploded perspective view thereof illustrating the alignment of the coupling magnets captured in the internal and external coupling components;

FIGS. 10A and 10B illustrate coupled rotation of the magnets when freely moving and continued rotation and axial translation of the external magnet when the internal magnet is restricted by a mechanical stop;

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Figure 1:
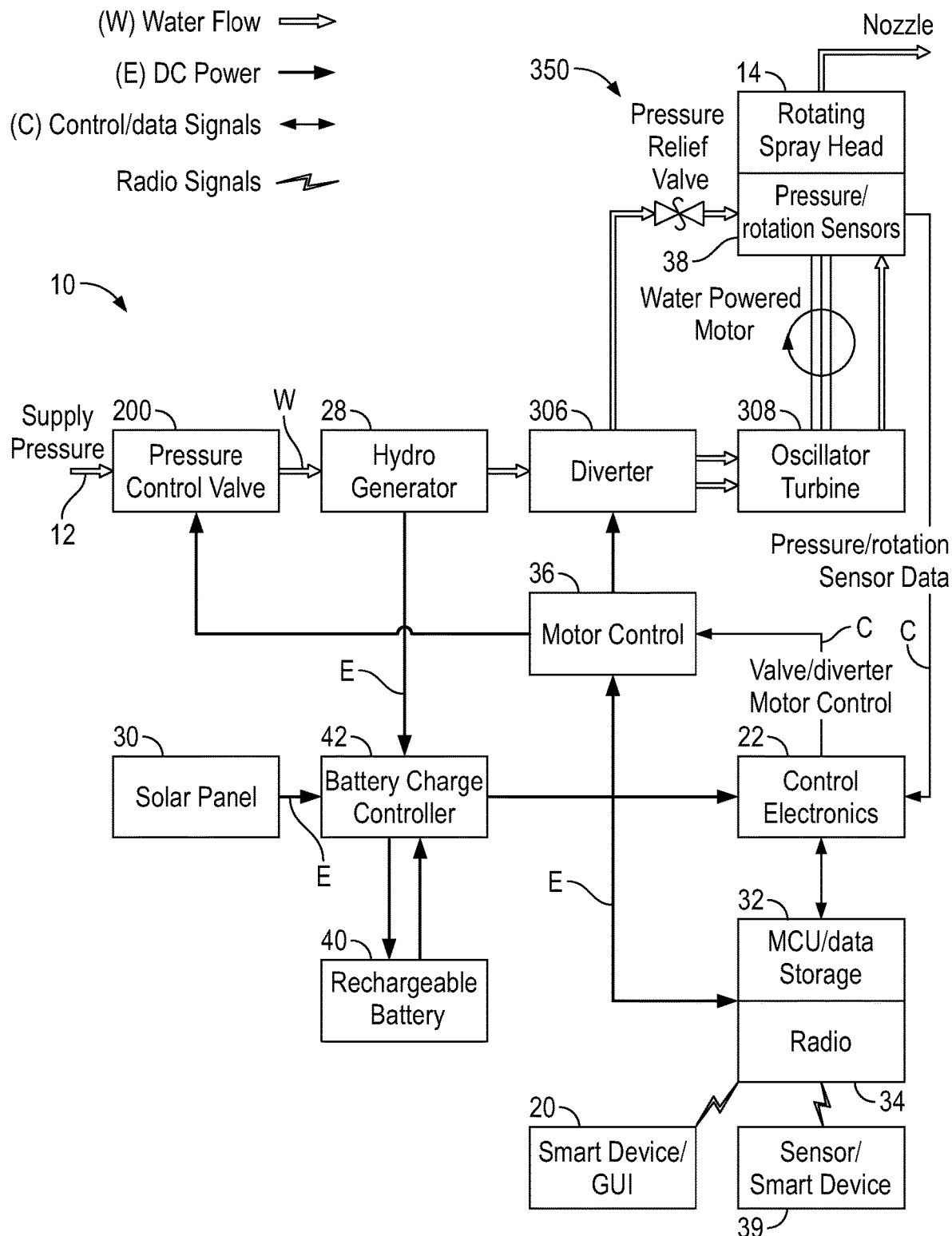
FIG. 1 illustrates an exemplary sprinkler system block diagram in accordance with the present invention.
Figure 2:
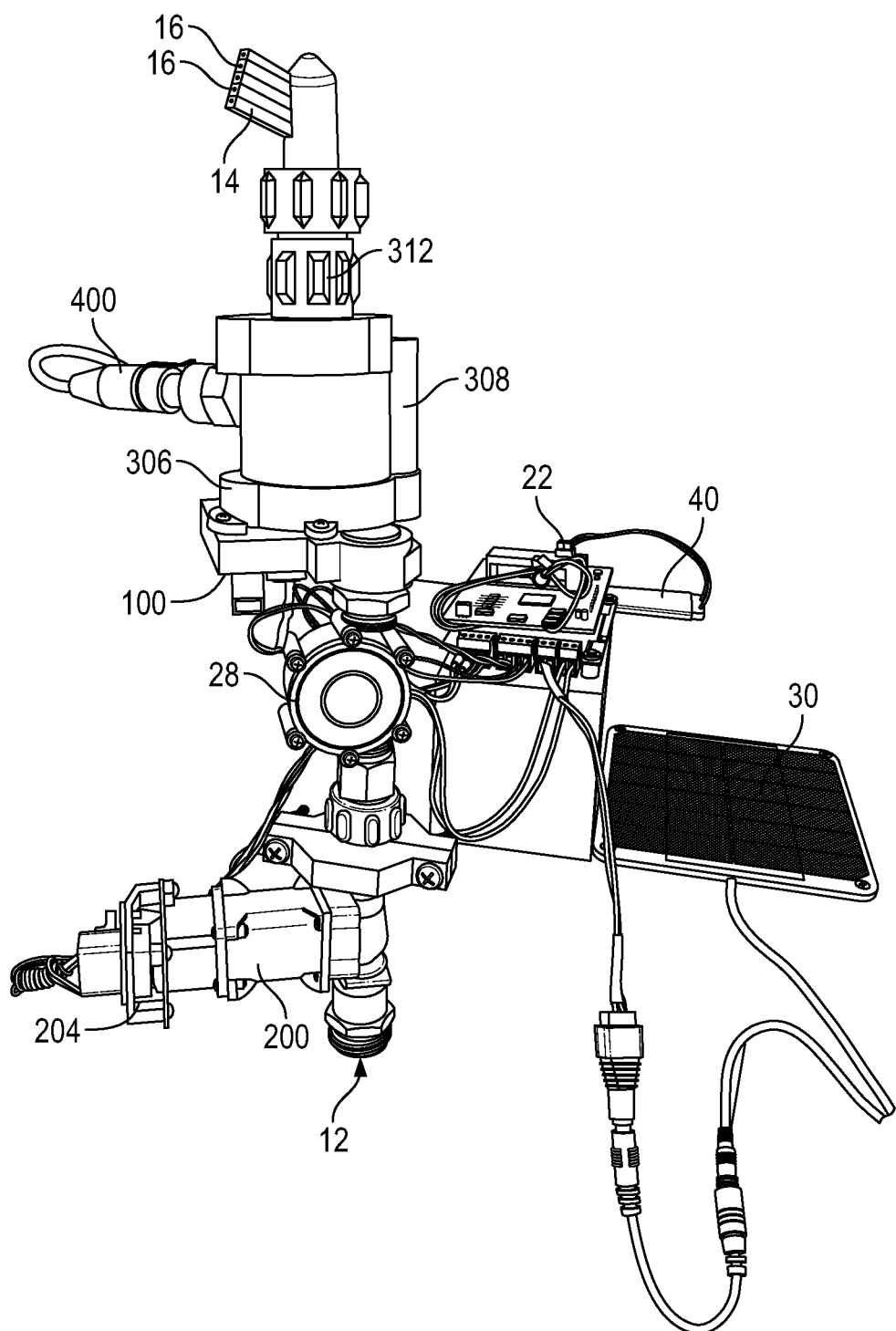
FIG. 2 illustrates an exemplary configuration of the present sprinkler system.
Figure 3:
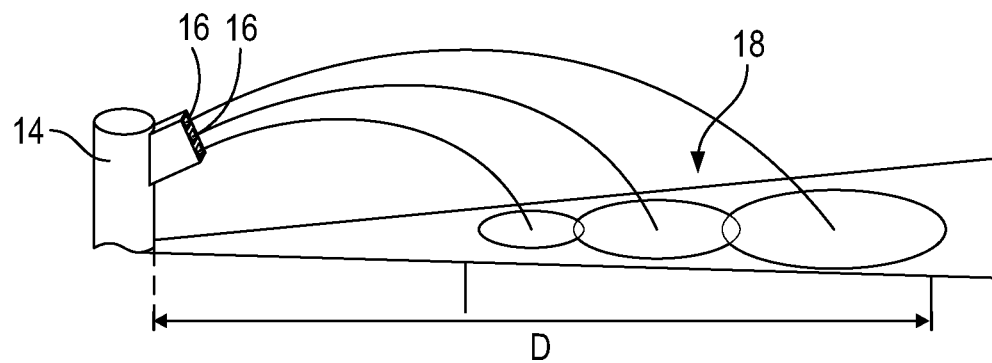
FIG. 3 illustrates an exemplary spray pattern using an angled nozzle head

Referring generally to FIGS. 1 through 4, a smart sprinkler system in accordance with the present disclosure is illustrated and generally indicated at 10. The smart sprinkler system 10 delivers water from a pressurized supply 12 to any location within its range via a spray nozzle or sprinkler head 14 that can be rotated in any direction. The spray nozzle 14 includes at least one, but preferably a plurality of, angled orifices 16 which create an elongated, somewhat narrow spray field 18 as generally illustrated in FIG. 3. The distance "D" of the spray field 18 is determined by the water pressure. The term "smart", in the context of the present system 10, refers to its ability to be controlled (wired or wirelessly) using a "smart" device 20, such as a smart phone or tablet that can run an associated application that communicates with the control electronics 22 of the system 10. The present system is implemented in a wireless configuration, and in particular, the wireless interface implemented in this exemplary system is a Bluetooth Low Energy (BLE) interface which is common to the category of personal devices known as smart devices (e.g. mobile phones, tablets).

It should be understood that other wired and wireless interfaces and standards could also be implemented with the same functionality. Indeed, the smart sprinkler system 10 requires a smart device 20 to control and configure the sprinkler system 10 using an associated application as noted above. Any electronic interface that is capable of supporting commands is a viable possibility. Once configured, much of the sprinkler functionality is controlled by the device autonomously. This division of labor, the sprinkler device 10 performing the functions of the sprinkler and the/phone/tablet device 20 providing the GUI, leverages the power of a device that is designed specifically for providing rich and familiar user interfaces, while alleviating the cost and complexity of providing a user interface on the sprinkler.

A defining characteristic of the sprinkler system 10 is that it is able to deliver a small footprint 18 of water to a specific location in a reproducible manner. There are several possible methods for accomplishing this goal.

The sprinkler head 14 rotates about a vertical axis, so the specification of a location can be represented in polar coordinates as an angle and a pressure, where the pressure is related to the radial distance D from the sprinkler head. The footprint of water striking the ground can best be envisioned as a narrow rectangle or short line segment radial to the nozzle 14. The footprint 18 is by design and represents a balance between having a fine resolution for placing water and avoiding too high a density of water striking the ground at a single location. The orientation of the rectangle lengthwise along the radius is also intentional, as the primary means of distributing the water in a pattern is by sweeping it over a curve.

Figure 4:
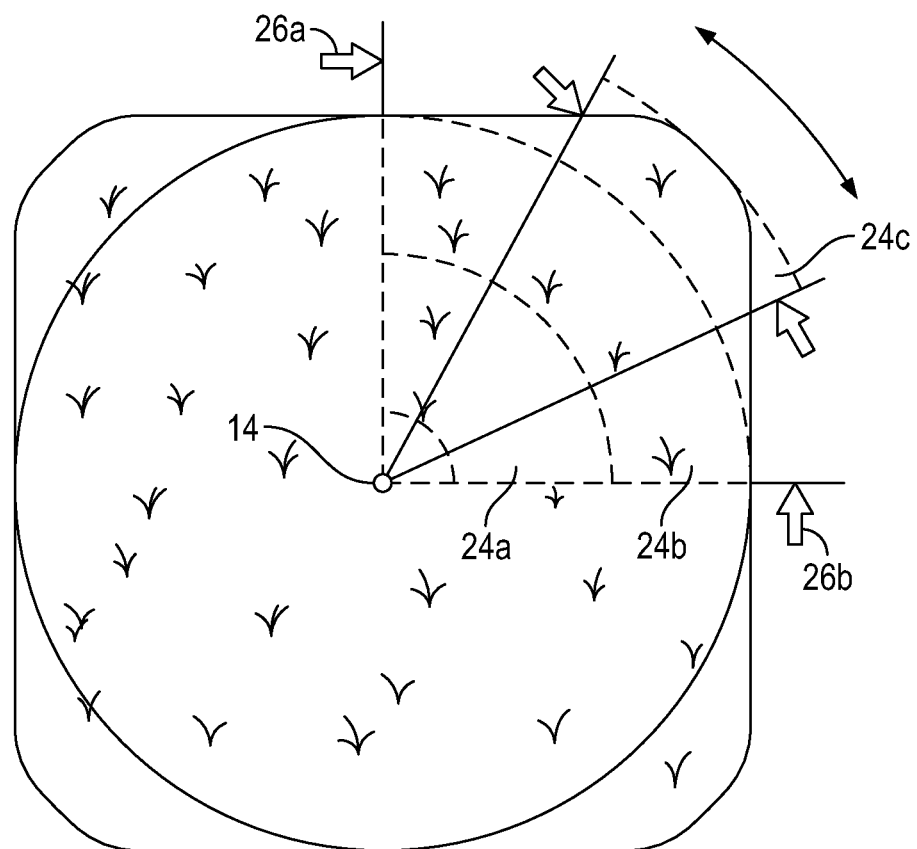
FIG. 4 diagrammatically illustrates an area to be watered overlaid with an exemplary programmed watering pattern which can be implemented with software for controlling the present invention.
Figure 4A:
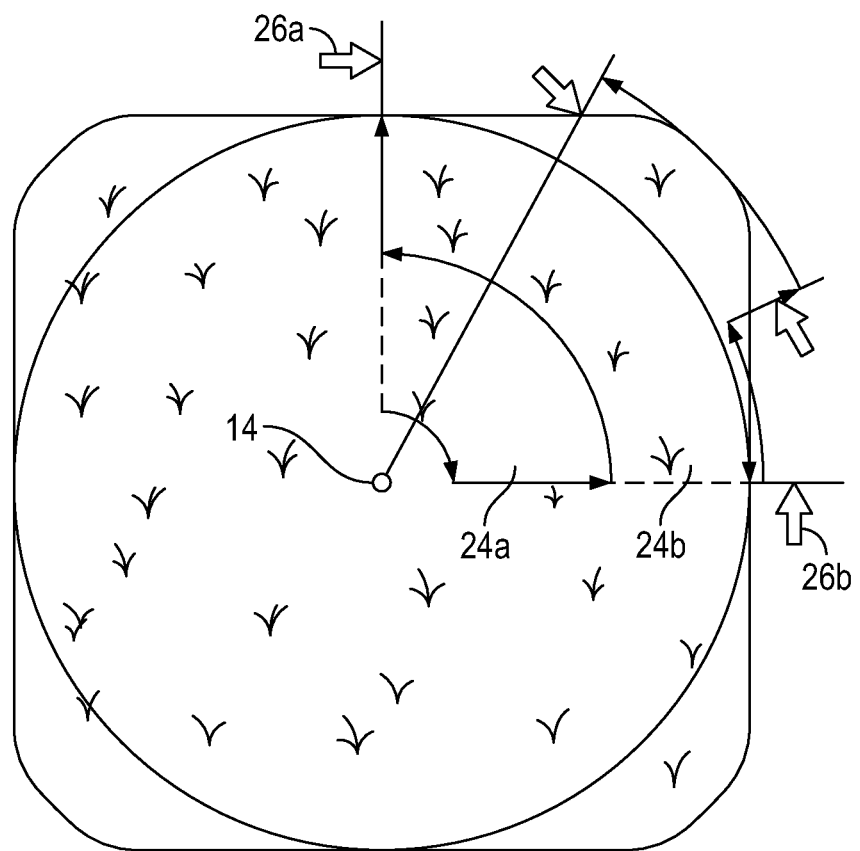
FIG. 4A illustrates rotation of the sprinkler head and adjustments of water pressure for distance to transcribe the desired watering pattern.

In a first exemplary method, a sprinkler pattern is created as a series of arcs 24a, 24b, 24c (FIGS. 4 and 4A), with each arc being defined as a pressure and two angles. The pressure represents the radius of the arc and the two angles represent the left and right ends or stops 26A, 26b of the associated arc. As the sprinkler describes the arc 24 over time, a narrow band of spray 18 is produced. A user is able to describe a series of arbitrary concentric arcs 24, which together combine into an arbitrary defined area as the sprinkler sweeps across each arc in sequence.

Figure 4B:
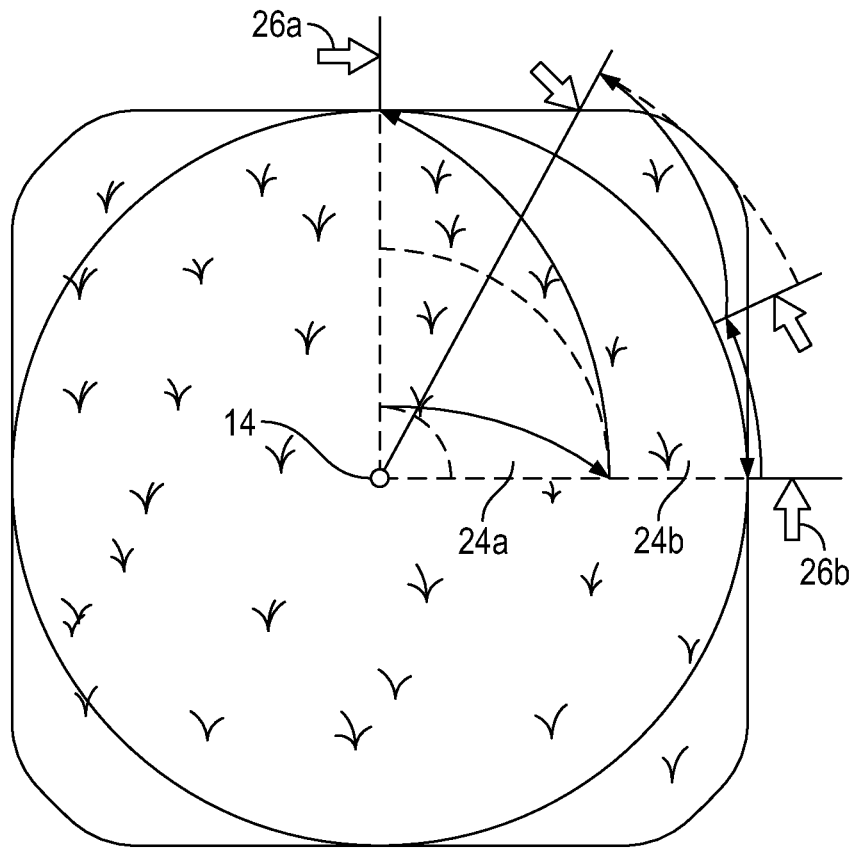
FIG. 4B-C diagrammatically illustrate another exemplary programmed watering pattern using a different algorithm where the pressure and rotation are changing concurrently in a vector system with polar coordinates.
Figure 4C:
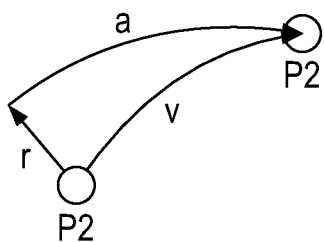
Figure 5:
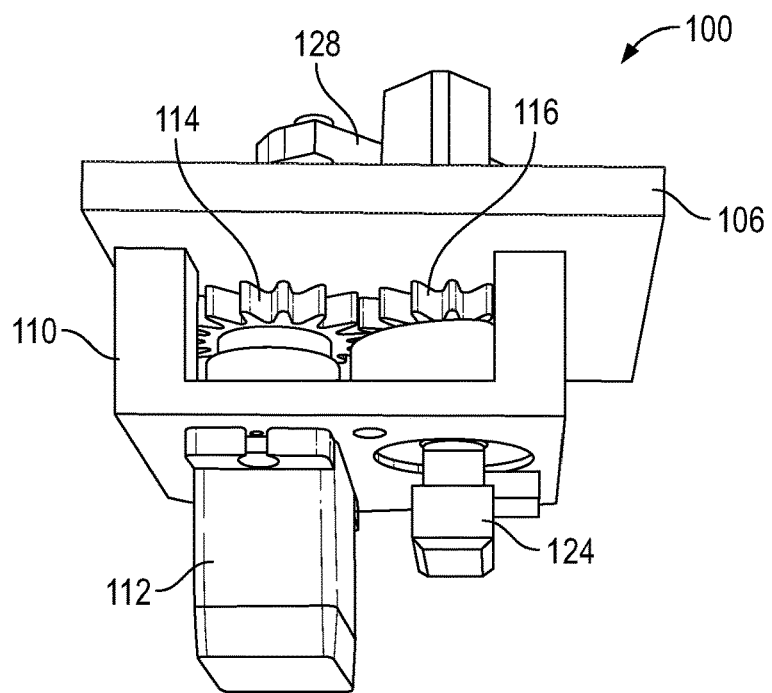
FIG. 5 is a bottom perspective view of an exemplary magnetic coupling and limit switch system illustrating the external drive components.
Figure 6:
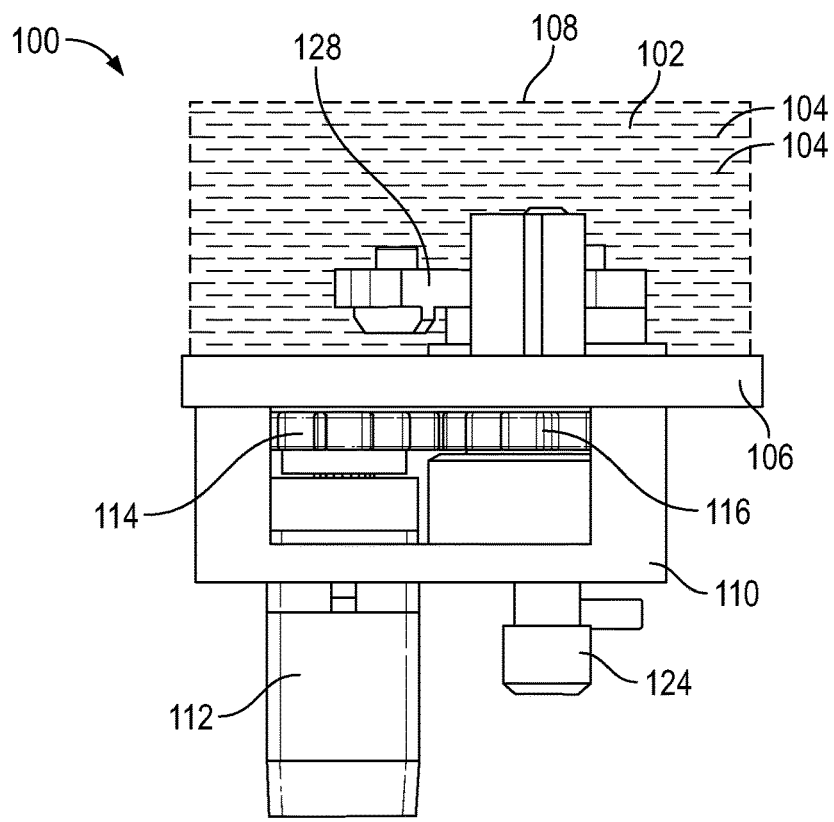
FIG. 6 is a side view thereof illustrating both the external drive components and the internal follower components.

In a second exemplary method, the curve is defined by two points P1, P2 with a change in pressure and change in rotation angle, relative to the sprinkler head S, which defines the center of a circle. The curve is, essentially a vector v in polar coordinates with a radial component r and an arc component a (FIG. 4C). A sprinkler, or watering, pattern is created as a sequence of such vectors 24a . . . 24n (FIG. 4B). As the sprinkler describes each curve 24 over time, a narrow band of spray 18 is produced. In describing a sequence of curves, a path is followed, which in totality deposits a volume of water on an area. A user is able to describe an arbitrary sequence of these curves 24 by defining the points P1, P2, . . . Pn. A schematic illustration of an area to be watered overlaid with such a sequence 24a . . . is illustrated in FIG. 4B.

It is also a defining characteristic of the sprinkler system 10 that it is able to operate with only a single connection to a water source 12 and in some embodiments does not require a connection to external electric power. This allows the present sprinkler system 10 to be a direct replacement for a typical lawn sprinkler, which is mechanically driven entirely by the energy provided by the supply pressure of the water source. Unlike a mechanical lawn sprinkler, which only provides one pressure (that of the supply) and one set of stops and can, therefore, only supply one pattern that is either roughly rectangular or circular (depending on the type), the present sprinkler system can create arbitrarily shaped patterns. It achieves this by using a circular lawn sprinkler mechanism to drive the rotation of the sprinkler head 14, but with an electric motor (oscillator/diverter mechanism 300—described below) to actuate the mechanism that controls the direction of the rotation. Additionally, present the sprinkler system 10 explicitly controls the water pressure delivered to the spray nozzle, up to the maximum of the supply pressure (i.e. there is no pump to add pressure above that of the supply). The system achieves this using an adjustable piloted valve (pilot valve assembly 200), which maximizes the use of the supplied pressure to affect changes to the valve. In short, the mechanism is designed to use as little energy as practicable.

In the present wireless configuration, required electrical energy is harvested from two sources: a hydro generator 28 in line with the water flow between the pressurized supply 12 and the nozzle 14 (input and output, respectively) and a solar panel 30. Both sources provide DC electricity used to power the electronics 22, MCU/memory 32, wireless radio 34, motor control 36 and sensors 38 that comprise the control system. The hydro generator 28 provides energy while the sprinkler is active (i.e. water is flowing through it) and the solar panel 30 captures energy from the sun, regardless of whether the sprinkler is active. Since the sprinkler is always consuming energy, the power system includes a rechargeable battery 40 and a battery charge controller 42. Thus, the two power sources 28. 30 are used to put energy into the battery 40, even as the device consumes energy. The energy system is balanced, such that it requires no additional power source under normal use. There is, however, an electrical connection (not shown) for attaching to an external charger for expediting an initial charge before first use or after storage.

In a wired system, the rechargeable battery 40, charge controller 42, hydro generator 28 and solar panel 30 could be eliminated to reduce complexity and cost.

The electrical components associated with the direct control of the sprinkler system 10 may comprise two low-power DC motors: one motor 202 for a piloted pressure control valve system 200 (See FIGS. 11-15) and the other motor 302 for a diverter system 300 (See FIGS. 16-23) that controls the rotational direction of the spray nozzle 14. The motors 202, 302 provide the input to magnetic couplings 204, 304 (further described below). The speed, duration and direction of the motors 202, 302 are controlled by algorithms running on a Microcontroller Unit (MCU) 32. The valve motor 202 is used to open and close a piloted valve system 200 incrementally and the diverter motor 302 is used to rotate an armature of the diverter assembly 300 to change the flow path in an oscillator which drives the sprinkler head 14 in either direction or may hold it stationary.

In order to provide closed loop control over the system, there are two sensors: a pressure sensor 400 and a magnetic rotational sensor 500. The pressure sensor 400 is embedded in the oscillator chamber of the oscillator/diverter assembly 300 and measures the water pressure delivered to the nozzle 14. When the desired pressure setpoint has been configured, the pressure sensor 400 supplies input to the algorithm, which opens and closes the pressure control valve 200 to maintain the nozzle pressure about the setpoint within a hysteresis range. This allows a pressure to be maintained without calibration of the supply pressure and as the supply pressure changes over time. Note that the output pressure is limited at an upper end by the native supply pressure (i.e. there is no mechanism for increasing the pressure beyond the supply pressure).

It should also be noted that additional environmental sensors 39, or smart sensors may also be deployed with and communicate with the present control system 32 (wired or wirelessly) to provide additional operational input. Sensors 39 may comprise temperature sensors, atmospheric pressure sensors, light sensors, rain sensors, moisture sensors, infrared heat sensors etc. to provide additional inputs to control or modify run days, run times, or run locations as configured.

The magnetic rotational sensor 500 is external to the oscillator chamber of the oscillator/diverter assembly 300 and in line with a magnet that is mechanically held to the rotational axis of the sprinkler head 14 or indirectly in correspondence with the sprinkler head 14. The magnetic field is diametric to the axis of rotation, which allows the sensor 500 to determine the angle of rotation of the sprinkler head 14 within a resolution less than one degree. This allows the algorithm to determine when the sprinkler head 14 has rotated to a desired angle and to then change the direction of rotation or stop the rotation using the motor 302 associated with the diverter armature.

The MCU 32 performs all functions related to the control of the sprinkler system 10 using software stored in non-volatile memory (firmware) within the MCU itself. The MCU 32 also includes storage, both volatile (RAM) and non-volatile, for storing data associated with the running of the device (e.g. the data defining a user-defined pattern). The MCU 32 also provides the radio 34 (Bluetooth) used to provide a wireless interface used by the external smart device 20 to configure and control the sprinkler remotely. The firmware defines and implements a command interface to provide these capabilities. Additionally, the MCU 32 provides timing and counting functions that allow the device to control when it starts or stops. It may be configured to, for example, repeat a user-defined pattern (See FIG. 4) for a specified duration or a specified number of times before shutting itself off.

FIG. 1 shows a block diagram of the components of the sprinkler 10 that enable all of the capabilities described above. The ultimate purpose of the system 10 is to deliver water from a supply to desired locations. FIG. 1 illustrates the path of the water flow (thicker arrows "W") through the system as it controls the water and extracts energy from the water to power the system. FIG. 1 also illustrates the path of energy (thinner arrows "E") as it is generated from the hydro generator 28 and solar panel 30, stored in the battery 40 and utilized. The system is also responsible for control, so the diagram shows the path of the control and data signals (lines "C"). Finally, the system offloads the responsibility for providing a user interface to the external smart device 20 and the wireless control interface for communication with the external smart device 20 is also illustrated.

Referring to FIG. 2, the water supply flows, first, into the pressure control valve assembly 200. The pressure control valve 200 is capable of shutting off the water supply entirely as well as providing a desired set water pressure from zero up to roughly the maximum limit of the native supply pressure. The water then flows into the hydro generator 28. A minimum amount of water pressure is required before the turbine inside the generator 28 will spin. Once it begins to spin, the output energy is relative to the speed of rotation or the output pressure of the control valve assembly 200. The water flow exits the hydro generator 28 and enters the oscillator/diverter assembly 300, which determines the direction of rotation of the sprinkler head 14.

The oscillator/diverter 300 achieves this by directing water through ports that lead to an oscillator turbine. Generally, each port directs water to one side or the other of the turbine, each port corresponding to one direction of rotation. The rotating turbine provides the mechanical energy to turn the sprinkler head 14. A diverter chamber also provides a direct path to the sprinkler head through a pressure relief valve. This allows excess water pressure to bypass the oscillator, which limits the maximum speed of rotation of the sprinkler head 14.

The electrical energy of the system includes rechargeable battery 40, allowing the sprinkler system 10 to be run over a wide range of circumstances. The battery 40 allows the energy to be budgeted, so that the energy generated does not have to be explicitly associated with energy consumption of specific components. Rather, generated energy is added to the battery 40 and energy consumed comes from the battery 40. This is all managed by the battery charge controller 42, which also performs voltage regulation. The battery charge controller 42 directs energy from the hydro generator 28, which is in the range of 0-5V, and the solar panel 30, which is in the range of 0-6V, into the rechargeable battery 40 (See FIG. 1). The variability of voltage stems from the fact that the generator 28 is not always running, and its RPMs are relative to the output water pressure. The solar panel 30 only produces energy during the day and its output is relative to the amount of direct sunlight. The energy consumed depends on whether the sprinkler is running. When it is running, the electronics associated with the motors 202, 302 and the sensors 400, 500 require 5V and represent the bulk of the energy consumption. The motor control circuit 36 and the sensors 400, 500 are powered only while the sprinkler is active. The motors 202, 302, which are the greatest consumers of energy by a factor of 10 are only driven intermittently and for relatively short durations. The MCU 32, which includes the radio 34, is always consuming some amount of energy, even when the sprinkler is off. Running at 3.3V, the energy consumption is less at its maximum, when the radio 34 is actively linked to the external smart device 20, than the electronics. The energy consumption is smaller when the system 10 is running autonomously versus when the system 10 is being remotely controlled. The control signals that trigger the motor driver and sense the output of the pressure and rotation sensors are components of this low voltage/power consumption.

Turning now to FIGS. 5-10, an exemplary magnetic coupling and switch assembly for use with a sealed chamber system is generally indicated at 100. The assembly 100 is generally used to transfer a rotational mechanical input force that is external to a sealed chamber 102 to a rotational mechanism that is internal to the chamber 102 which may be filled with fluid 104 under pressure. The exemplary embodiment shown in FIGS. 5-10 is a universal configuration that could be used in any sealed chamber system to translate external motion to an internal component and to provide a linear (axial) switching actuator external to the chamber 102. These general magnetic coupling and actuator principles are used in conjunction with two separate systems described with the present system hereinafter. First, for rotation of the lead screw of a variable pressure pilot valve system generally indicated 200 (FIGS. 11-15). Second, for rotation of an oscillator/diverter lever in a water driven turbine rotation system 300 for the spray nozzle (FIGS. 16-23).

The magnetic coupling assemblies have the following characteristics:

The internal chamber 102 is hermetically sealed. There are no mechanical components penetrating the chamber which would require hydraulic seals.

The connection between the external and internal members introduce minimal friction, due to the elimination of seals and due to the force vectors associated with the magnetic fields.

The magnetic coupling uniquely provides the ability for an external sensor to detect when the internal mechanism has reached a hard stop.

The magnetic coupling also inherently functions as a safety clutch, allowing the coupling to disengage without damage or wear.

FIGS. 5-8 illustrate the components that are both external to the chamber 102 and internal to the chamber. The boundary between internal and external is defined by the wall 106. The inside of the chamber 102 being above the wall 106 and further defined by walls 108 illustrated in broken line in FIG. 6. In the drawing figures, the external components are below the boundary wall 106. The active external components are mounted on a fixed stand 110, which maintains the position and orientation of the external components relative to each other and to the internal components. The exemplary mechanism is driven by a reversible motor 112. A motor gear 114 is mounted to the motor shaft (not shown). The motor gear 114 engages with and drives a magnetic coupling gear 116. The magnetic coupling gear 116 has a square hole 118 traversing it from top to bottom (See FIG. 9). In this hole, is an external square magnet 120 (FIG. 9) abutting the chamber boundary wall 106 and a magnet adapter 122 (also in FIG. 9) that couples the magnet 120 to a limit switch 124. Note that a bracket holding the limit switch 124 is not shown. The magnet 120 and the magnet adapter 122, being square are not able to rotate freely within the magnetic coupling gear 116, so that the rotation of the magnetic coupling gear 116 is transmitted to the magnet 120 and the magnet adapter 122, making them also driven by the coupling gear 116. The magnet 120 and the magnet adaptor 122 can move freely in the direction perpendicular to the chamber boundary wall 106 (axially along the axis of rotation of the magnetic coupling gear 116). This axial motion of the magnet 120 causes the limit switch 124 to actuate, closing and opening as the magnet 120 and magnet adaptor 122 move away from and toward the chamber boundary wall 106, respectively.

Figure 7:
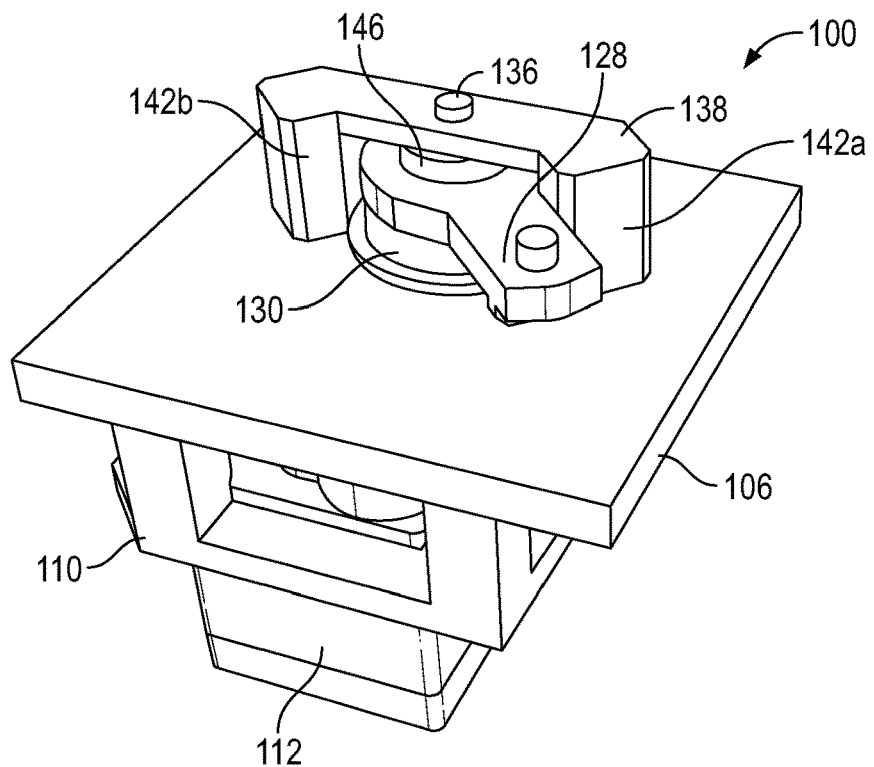
FIG. 7 is a top perspective view thereof illustrating the internal follower arm and mechanical stops.
Figure 8:
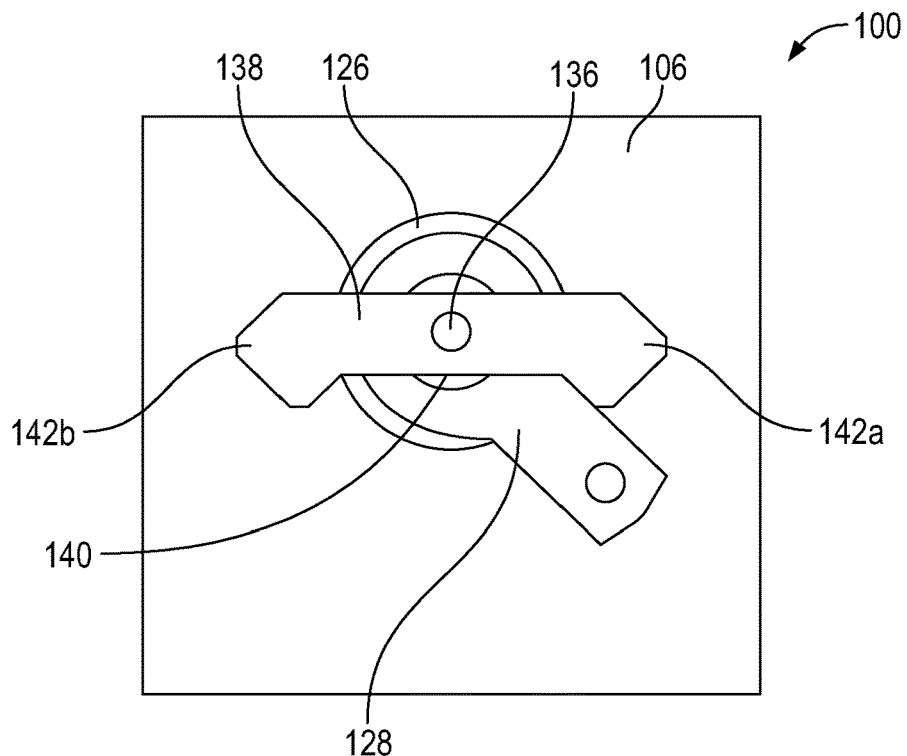
FIG. 8 is a top view thereof.
Figure 11:
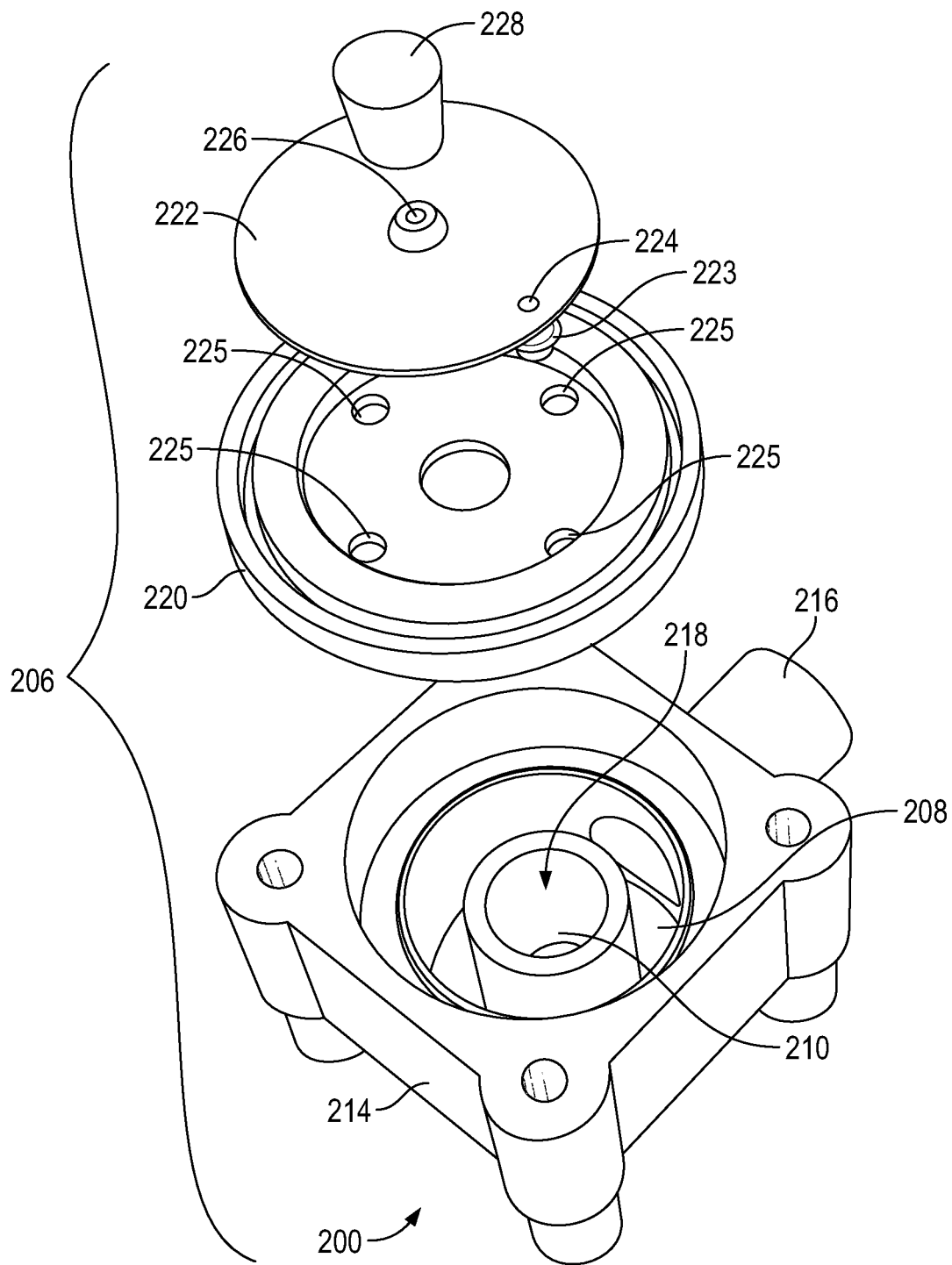
FIG. 11 illustrates an exemplary pilot valve which is adapted for variable pressure control with a magnetically actuated lead screw.

FIGS. 7-9 best illustrate the components that are internal to the chamber 102. The chamber boundary wall 106, as shown, incorporates a well 126 that holds a rotating armature 128 in place. The armature 128 sits inside a bushing 130 inside the well to reduce friction. The well 126 also reduces the thickness of the boundary wall 106. The armature 128 includes a square socket 132 that captures another internal square magnet 134 (best seen in FIG. 9). Opposite the well, an axle 136 supports the rotation of the armature 128 on an axis perpendicular to the chamber wall 106. The axle 136 is captured by a fixed mount 138 and a washer 140. The mount 138 incorporates stops 142a, 142b that restrict the rotation of the armature 128 (see FIG. 8).

FIG. 9 presents a simplified exploded view that shows the alignment of the rotational components of the assembly; both internal and external to the chamber 102. The components below the boundary wall 106 are external to the chamber 102 and those above are internal. The boundary wall 106 is shown in cross section and shows the reduced thickness of the boundary wall at the bottom of the well 126 in which the internal components are seated. The motor gear 114 is shown for reference without the motor 112 that drives it.

Magnetic coupling is effected by the external magnet 120 and the internal magnet 134. The poles of the magnets 120, 134 are parallel to the boundary wall 106. In the diagram, they are shown in phase; the north and south poles of the external magnet 120 are aligned with the south and north poles, respectively, of the internal magnet 134. This supplies the maximum attractive force normal to the boundary wall 106 with a net torque of zero about the center line (axis).

The external magnet 120 is captured by the square hole 118 in the magnet coupling gear 116. As the magnetic coupling gear 116 is driven by the motor gear 114, the magnet 120 is correspondingly rotated about the center line. The magnet adapter 122 is also located in the square hole 118, adjacent to the magnet 120 and between the magnet 120 and the limit switch 124. It is also square and rotates in correspondence to the magnetic coupling gear 116 and the magnet 120. It serves to mate the square magnet 120 to the round button on the limit switch 124. The magnet 120 and magnet adaptor 122, while rotationally restricted, are free to move normal to the boundary wall 106.

Inside the chamber 102 (above the wall 106), the internal magnet 134 is captured by the square socket 132 in the rotating armature 128. The armature 128 is seated in the well 126 of the boundary wall 106 inside bushing 130, which allows the armature 128 to rotate freely, in correspondence with the rotation of the internal magnet 134. The armature 128 is secured at the surface opposite the boundary by the axle 136 and washer 140 held by the fixed mount 138. This arrangement allows the armature 128 to rotate but restricts the movement of the armature 128 normal to the boundary wall 106.

Turning to FIGS. 10A-10B, the behavior of the magnetic coupling is driven by the motor 112, which rotates the motor gear 114. The motor gear 114, in turn, rotates the external magnet coupling gear 116, which rotates the external magnet 120. As the external magnet 120 rotates, it becomes out of phase with the internal magnet 134. The force vector associated with the magnets 120, 134 is proportionally skewed from normal and develops a rotational component. The resultant torque increases as the phase angle increases. At some point, the torque increases enough to rotate the internal magnet 134 (See FIG. 10A). The internal magnet 134 rotation drives the armature 128, accordingly.

Rotation of the armature 128 is restricted by stops 142a, 142b (see FIG. 8). Once the coupling is rotated to the point of contacting a stop 142, the armature 128 can no longer rotate. At this point, the external magnet 120 continues to be driven, increasing the phase angle between the two magnets 120, 134. When the phase angle increases to 90 degrees, the force vector becomes completely rotational; there is no force normal to the boundary. As the angle increases beyond 90 degrees, the force normal to the boundary reverses, becoming repulsive. At some point, the repulsive force become large enough to push the external magnet 120 away from the boundary wall 106 (see FIG. 10B). The repulsive force is transmitted through the magnet adapter 122. At some point, the repulsive force increases enough to force axial movement of the magnet 120 and magnet adapter 122 and activate the spring-loaded limit switch 124. The activation of the limit switch 124 is detected electronically, and the motor 112 is stopped.

The motor 112 is then reversed via the electronics, which decreases the phase angle. As the phase angle decreases, the repulsive force decreases until it is nullified at the 90 degree phase angle. As the motor 112 (and external magnet 120) continues to rotate then the force becomes attractive and increases to its maximum at the zero degree phase angle. At some point, the external magnet 120 moves back toward the boundary wall 106 and releases the limit switch 124. The motor 112 is stopped again, once the limit switch 124 is deactivated.

This reverse motion that is terminated with the release of the limit switch 124 is called the back-off period. When rotating the coupling towards one of the stops 142, the external magnet 120 is intentionally over-rotated after the armature 128 is physically stopped. The over-rotation causes an increase in the phase angle. Since the limit switch 124 cannot be activated, except via a repulsive force between the magnets 120, 134, the limit switch 124 is not engaged until the phase angle exceeds 90 degrees. The limit switch 124 activation marks the beginning of the back-off period, when the motor 112 is reversed. The limit switch 124 cannot be disengaged until the repulsive force is removed and the magnetic force transitions from repulsion to attraction. Therefore, the limit switch 124 is released when the phase angle is reduced to less than 90 degrees, which marks the end of the back-off period. At the end of the back-off period, the phase angle is such that the magnetic force vector holds the armature 128 against the boundary and against the stop 142. Note that this assumes that the motor 112 and motor gear 114 are locked in position.

In alternative arrangements, the limit switch 124, which operates to sense armature 128 position, could be replaced with a solid state sensor, such as optical or magnetic sensors. For example, for an optical sensor system the chamber boundary wall 106 separating the magnets 120,134 could be optically clear. There could be optical sensors (2) (not shown) located strategically at the hard stops inside the chamber 102. The sensor could then pick up on the armature 128 inside being in position at the hard stop 142. From a power resource view, even though these sensors are, themselves, consuming energy, it would actually be a win energy-wise because the limit switch 124 requires the motor 112 to be over-rotated to activate the limit switch and then the motor must be reversed to perform the back-off movement. The extra back and forth movement represents an additional 180+ degree movement that would not be required if using such an optical solid state sensor. Since the motor itself is a much larger consumer of energy, the extra movement is costly. Also, the sensors can be turned off until they are actually needed (i.e. just before the motor movement). On balance, using a solid state sensor may be a significant improvement energy-wise and time-wise, since the motor over rotation movement does take time.

As noted, the generic magnetic coupling system 100 described above is useful in any sealed chamber system where there is a need to reduce seal and friction between moving parts. Further exemplary coupling systems are described below in connection with the piloted valve system 200 and the oscillator/diverter assembly 300.

Referring now to FIGS. 11-16, there is shown and described an exemplary pressure control valve assembly 200 controlled by magnetic coupling assembly 204 having the operational characteristics as generally described hereinabove.

The pressure control valve 200 adjusts the water pressure delivered to the spray nozzle 14. The distance of the spray is proportional to the pressure. In the exemplary system, the valve 200 is controlled by a motor 202, making it capable of being controlled algorithmically by microprocessor 22. The system 200 incorporates pressure sensor 400 located adjacent the nozzle 14, which allows the system to operate as a closed loop with respect to water pressure.

The basis of the control valve 200 is a pilot valve 206 which is used to control the water pressure delivered to the sprinkler head 14. The pilot valve 206 may comprise three chambers: the input chamber 208, the output chamber 210 and the control chamber 212 (see FIGS. 13-14), attached to the top of a valve seat 214. The input chamber 208 is supplied with water through an input port 216. The pressure in the input chamber 208 is always the maximum pressure, which is referred to as the supply pressure. The output chamber 210 is vented to the atmosphere via an outlet 218 and, ultimately, to the spray nozzle 14. Atmospheric pressure is considered the zero pressure.

When the valve 200 is closed, the pressure in the output chamber 210 is zero. When the valve 200 is open, there is, typically, back pressure due to the relatively narrow orifice of the nozzle 14. Therefore, the output pressure may be greater than zero, but is always less than the supply pressure.

The primary flow of water flows between the input chamber 208 and the output chamber 210 directly when the valve is open. A secondary flow path is through the control chamber 212, which is separated from the input/output chambers 208, 210 by a flexible diaphragm 220 that incorporates into it a rigid stabilizer 222. The stabilizer 222 is connected to the diaphragm 220 by a plurality of circumferentially spaced posts 223 (only one visible) which are press fit through corresponding holes 225 in the diaphragm 220. Four points of connection provide higher rigidity to the diaphragm 220, prevent vibrational instability caused by water flow and allow the valve to stabilize in the desired position more quickly.

Water flows into the control chamber 212 through an input pilot hole 224, which is always open. Pilot hole 224 extends through one of the connection posts 223. The water flows from the control chamber 212 to the output chamber 210 via an output pilot hole 226, which may be opened or closed by a plug 228.

The benefit of the pilot valve arrangement is that a very small amount of energy is necessary to open or close it. The control input is a matter of opening or closing the output pilot hole 226 using the plug 228. The amount of energy involved is very small because the force necessary is a product of the very small area of the output pilot hole 226 and the pressure differential between the control chamber 212 and the output chamber 210. Once the pilot hole 226 is opened or closed, the primary flow of water between the input chamber 208 and output chamber 210 is affected by the position of the diaphragm 220, which is a function of the force differential on the two sides of the diaphragm 220. On one side of the diaphragm 220, the force is a product of the area of the diaphragm 220 and the pressure in the control chamber 212. On the other side, the total force is the sum of the force on the area adjacent to the input chamber 208 and the force adjacent to the output chamber 210. Note that the area adjacent to the input chamber 208 is significantly larger than the output area.

When the plug 228 is blocking the output pilot hole 226, the input pilot hole 224 causes the input chamber 208 and control chamber 212 to equalize, so the forces on both sides of the diaphragm 220 corresponding to the input area are equal. Since the output pressure is always less than the supply pressure, the area adjacent to the output chamber 210 is less than the corresponding area in the control chamber 212. This differential causes the diaphragm 220 to press toward the output port 218, restricting water flow and, ultimately, closing and sealing the output port 218. When the plug 228 is not blocking the output pilot hole 226, the pressure in the control chamber 212 equalizes with the output chamber 210. In this state, the force on both sides of the diaphragm 220 adjacent to the output area is equal. Since the control chamber pressure is less than the input chamber pressure, the force on the area adjacent to the input chamber 208 is larger on the input chamber side and the diaphragm 220 is pushed away from the output port 218, allowing more water to flow. Note that when the diaphragm 220 is fully open, there is necessarily a pressure differential between the supply pressure and the control/output pressure because it is the differential that is holding the diaphragm open. That means there is a small loss of pressure when using this type of valve.

Figure 12:
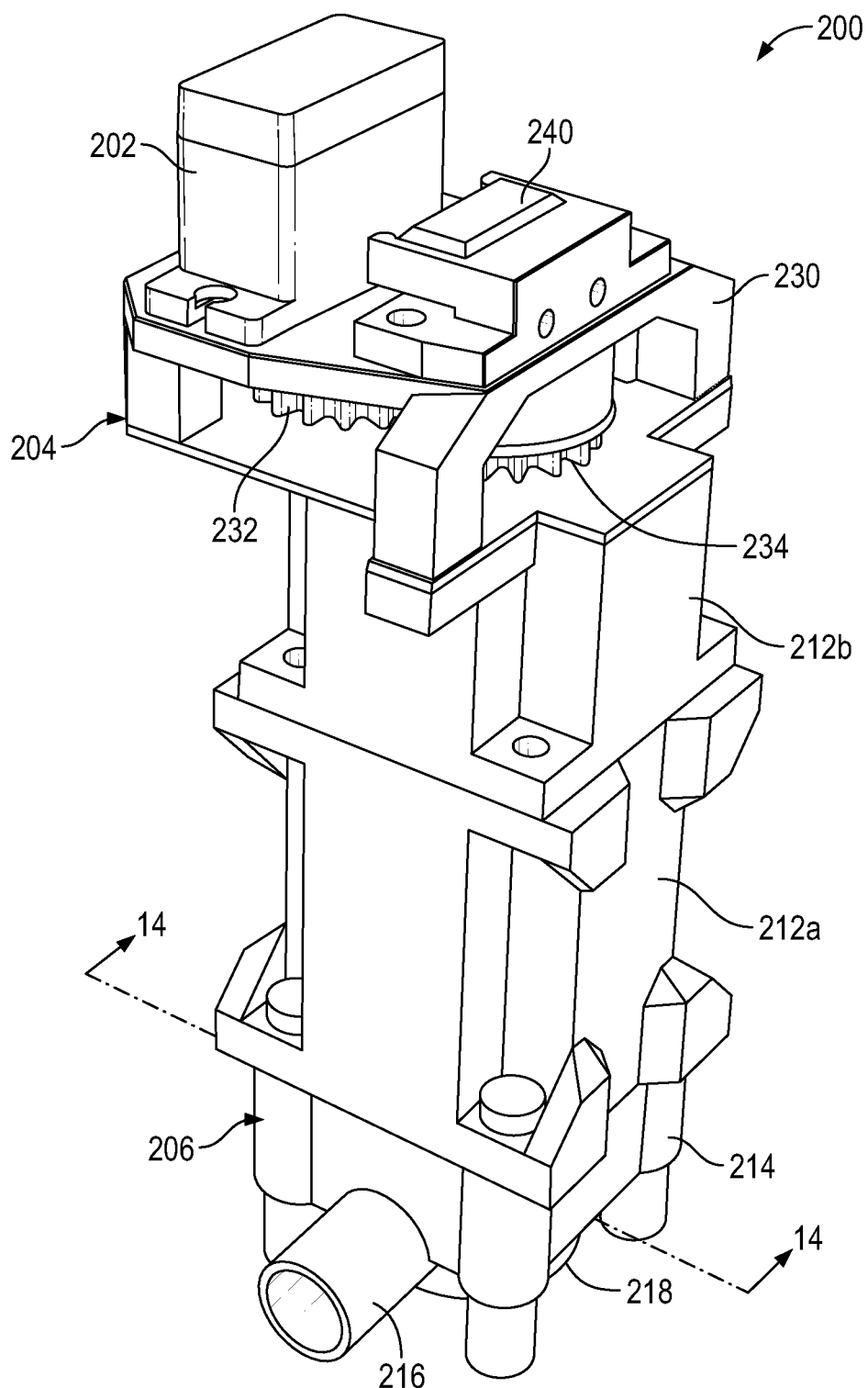
FIG. 12 illustrates a full assembly view of the pilot valve pressure control.
Figure 13:
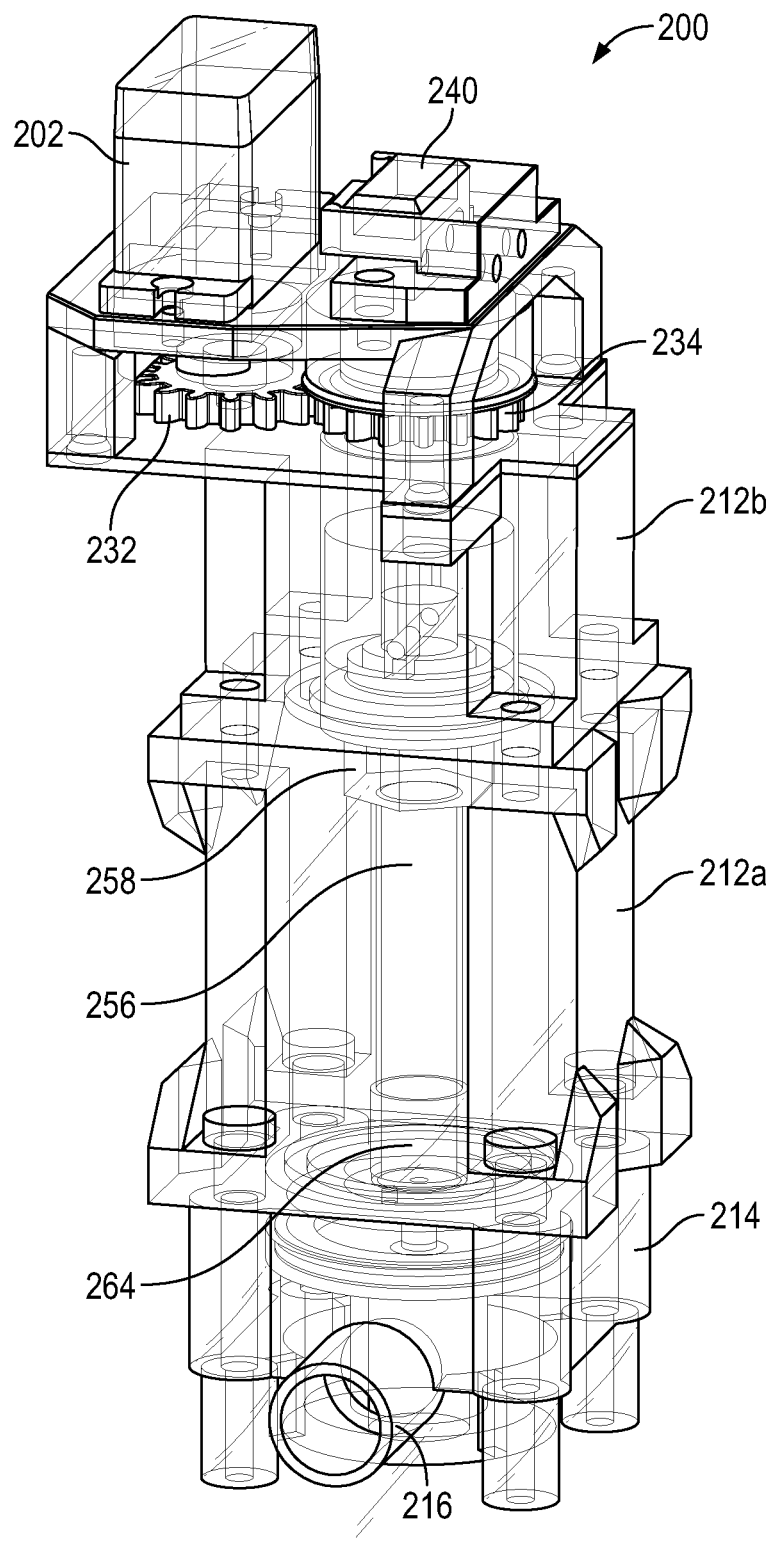
FIG. 13 is a perspective view thereof shown partially in transparency.
Figure 14:
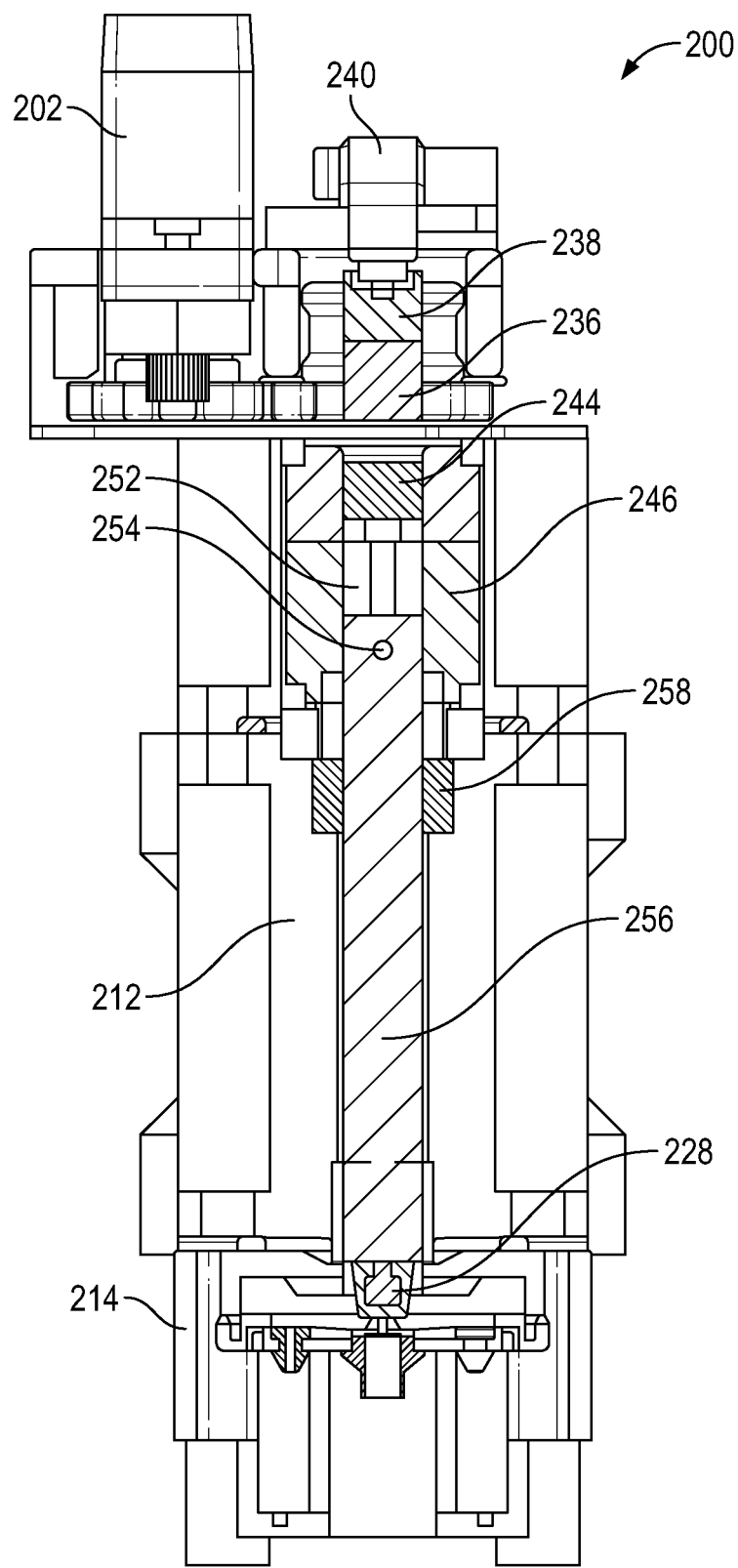
FIG. 14 is a cross-sectional view thereof taken along line 14-14 of FIG. 12.

FIGS. 12-14 show the full valve assembly 200 with the pilot valve mechanism at the bottom with its input port 216. The basic function of the pilot valve chambers 208, 210, 212 and diaphragm 220 is conventional in the art. However, the method of controlling the valve 200 is unique. The control chamber 212 is comprised of two parts 212a, 212b, as shown, and encompasses the control components of the valve. The external drive for movement of the plug 228 is supplied via a magnetic coupling 100 generally as described hereabove, the external parts of which are shown and include motor 202, stand 230, drive gear 232, magnetic coupling gear 234, external magnet 236, magnet adapter 238 and limit switch 240. The internal parts of the magnetic coupling 100 drive a control mechanism 242 that results in the plug 228 moving normal to the output port of the diaphragm 220.

Figure 15:
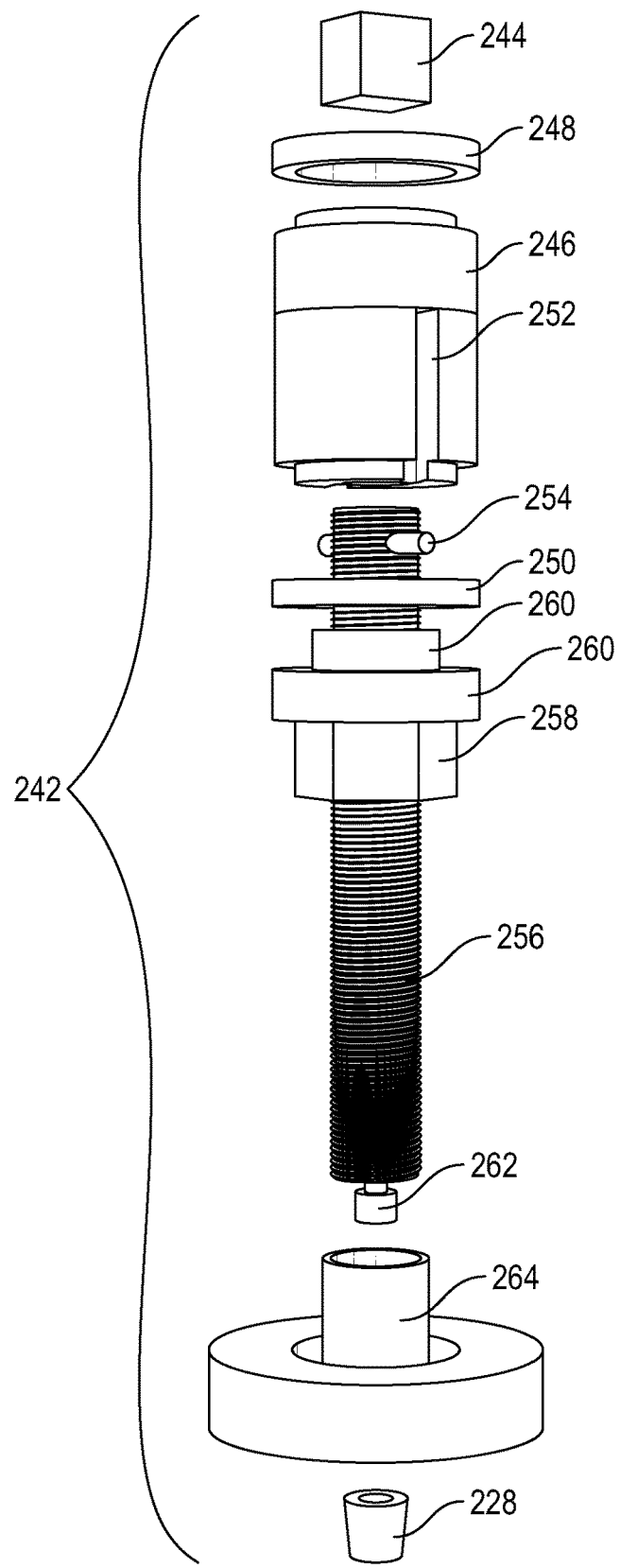
FIG. 15 is an exploded perspective view of the valve control mechanism for the pilot valve.

FIG. 15 shows the control mechanism 242 internal to the control chamber 212. The mechanism 242 is driven rotationally by the external magnet 236 (FIGS. 12-14), causing an internal magnet 244 to rotate, accordingly. The internal magnet 244 is captured in a square socket at the top of a magnet adapter 246. The magnet adapter 246 rotates within bushings 248 and 250 at top and bottom respectively inside a cylindrical void in the control chamber housing 212 (FIG. 14). The magnet adapter 246 incorporates slots 252 that trap a control arm 254 that is embedded radially in a threaded leadscrew 256. The leadscrew 256 engages a nut 258 that is captured by the control chamber housing 212. Two bushings 260a, 260b provide the bearing surface between the rotating magnet adapter 246 and the stationary nut 256. The bottom of the leadscrew 256 incorporates a flange 262 around which the rubber plug 228 is molded. A leadscrew guide 264 ensures the plug 228 is centered on the output pilot hole 226. It also serves to lock the diaphragm 220 in place in the pilot valve mechanism. Note that it is stationary.

The pilot valve control mechanism 200 operates in the same manner as the magnetic coupling mechanism 100 described hereinabove. The external motor 202 drives the external magnetic coupling gear 234 and external magnet 236, which then drives the internal magnet 244. The square magnet 244, being trapped in a square socket rotates the magnet adapter 246, which rotates the leadscrew 256 via the control arm 254. As the leadscrew 256 turns in the trapped nut 258, it moves up and down relative to its rotational axis. This causes the plug 228 to unblock and block the output pilot hole 226, accordingly. When the pilot hole 226 is unblocked, the diaphragm 220 rises and increases water flow through the valve 200. When the diaphragm 220 rises and contacts the plug 228, the pilot hole 226 is blocked, and the diaphragm 220 is pushed back down by the control chamber pressure and the water flow decreases. As equilibrium is reached, the resulting behavior is that the diaphragm 220 follows and is positioned by the control mechanism 242. This allows the external motor 202 of the magnetic coupling arrangement 204 to effectively control the water flow through the valve 200 and, ultimately, the water pressure delivered to the sprinkler nozzle 14.

The pressure control valve 200 uses the magnetic coupling 204 for the control input and includes limit switch 240 as also described above. The limit switch 240 is not used to control the variable pressure, but it is used to ensure that the valve 200 is closed. When the leadscrew 256 is driven all the way to the closed position then it can no longer rotate. The external magnet 236 will continue to rotate and the magnets 236, 244 will become out of phase. Eventually, the phase angle will become large enough to force an axial repulsion and activate the limit switch 240, which will be detected, indicating that the valve 200 is completely closed. Likewise, when opening the valve 200, activation of the limit switch 240 will occur when the valve is opened to its mechanical limit.

An interesting benefit to this arrangement is that pilot valves require a minimum amount of pressure to stay closed. For example, if you connect one to a water supply that is off and then turn the supply on, you will typically get a short burst of water and then the valve will seal. That does not happen with this implementation because the leadscrew 256 mechanically holds the diaphragm 220 closed.

With respect to the use of alternate sensors in the pressure control valve 200, which uses a lead screw 256, it would make sense to keep the limit switch 240 because the hard stops are only used to detect closing the valve and opening it to its maximum travel. However, it could still benefit from using an optical sensor, though. For example, if the control chamber 212 has an optically clear window then the lead screw travel could be monitored by an encoder. That is typically implemented by including lines on the shaft that can be counted by the sensor. This allows for tracking exactly how much the screw has rotated inside the chamber.

While the present pressure valve embodiment 200 is illustrated and described as being controlled by a motor assembly 202, the valve 200 could be manually controlled or controlled by other actuators. For example, a manually controlled pilot valve assembly 200 (without motor or without motor and gears, i.e. manually rotating the external magnet itself) could find use in other applications as a conventional faucet valve or spigot (not shown).

Turning now to FIGS. 16-23, there is illustrated and described an oscillator/diverter assembly 300 which is based on a water turbine rotation mechanism wherein the position of a diverter arm is electronically controlled by a magnetic coupling mechanism 304 in accordance with the above teachings. The assembly 300 generally includes drive motor 302, the magnetic coupling assembly 304, a diverter assembly 306 and an oscillator drive assembly 308.

The oscillator drive portion 308 is a water powered turbine motor that rotates a shaft 310 and neck 312 to which spray nozzle 14 is secured. The rotation thereby provides the ability to direct spray in different directions. The oscillator drive portion 308 incorporates an assembly of components that allow the drive to reverse the direction by directing the flow of water in one of two orientations causing a turbine wheel 314 to rotate in one of two directions, accordingly. The turbine wheel 314 provides the rotational input force to the water powered motor, so reversing the turbine direction also reverses the motor direction. The assembly which is used to change the motor direction is, therefore, the diverter assembly 306.

The diverter assembly 306 allows the direction change to occur as a result of electrical input to the reversible electric motor 302. The electric input is controlled by electronics, which allows the direction of the oscillator 308 to be controlled via electronic input, including microprocessor control. An additional benefit of this type of control is that the diverter 306 includes a neutral or idle position. That is, the water flow can be directed equally to both sides of the turbine wheel 314, creating a net zero force in either direction causing the water powered motor to stop. It is also possible to control the speed of the water flow in either direction, thereby providing the ability to use the diverter 306 as a speed control for the water powered motor.

Figure 16:
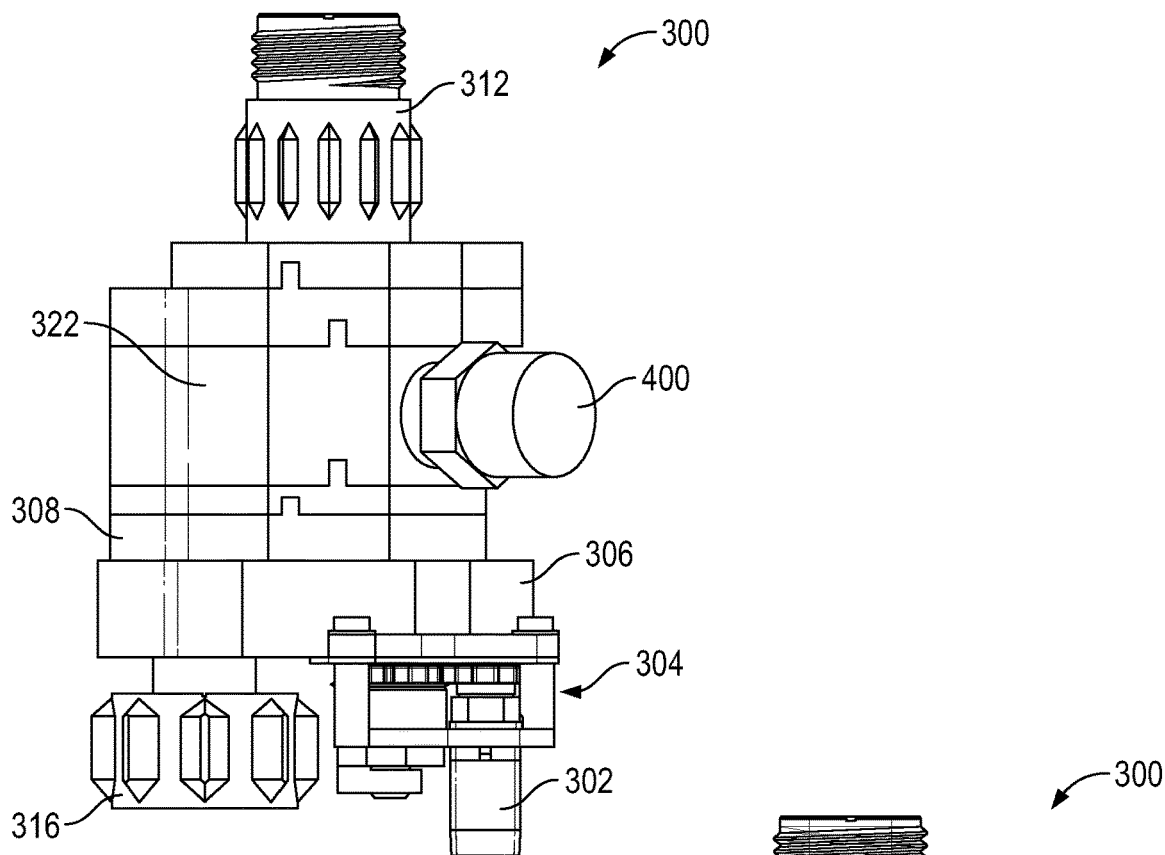
FIG. 16 is a plan view of an exemplary oscillator/diverter mechanism in accordance with the present invention.
Figure 17:
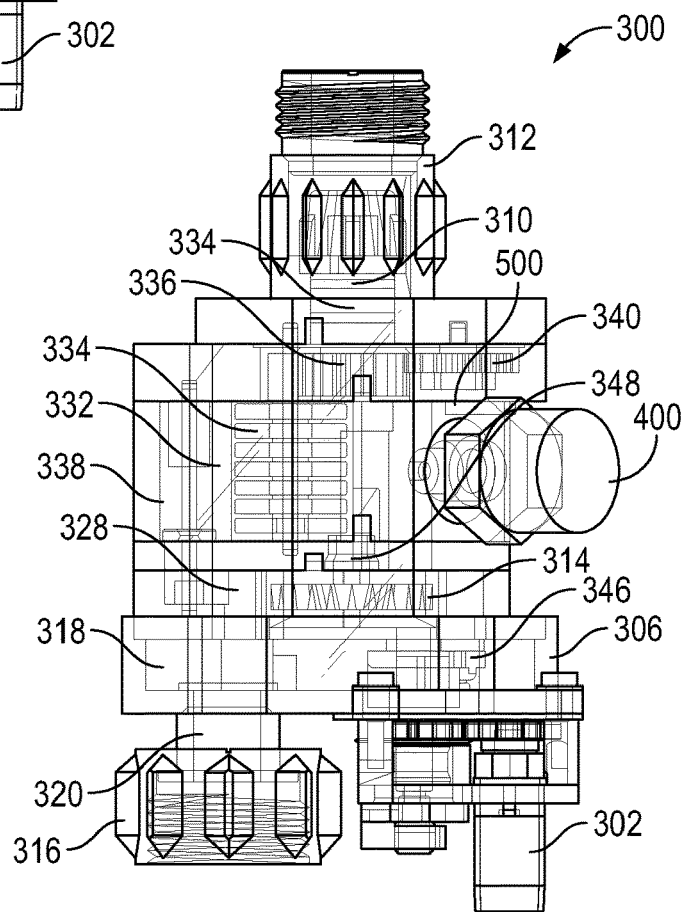
FIG. 17 is another plan view thereof shown partially in transparency.
Figure 18:
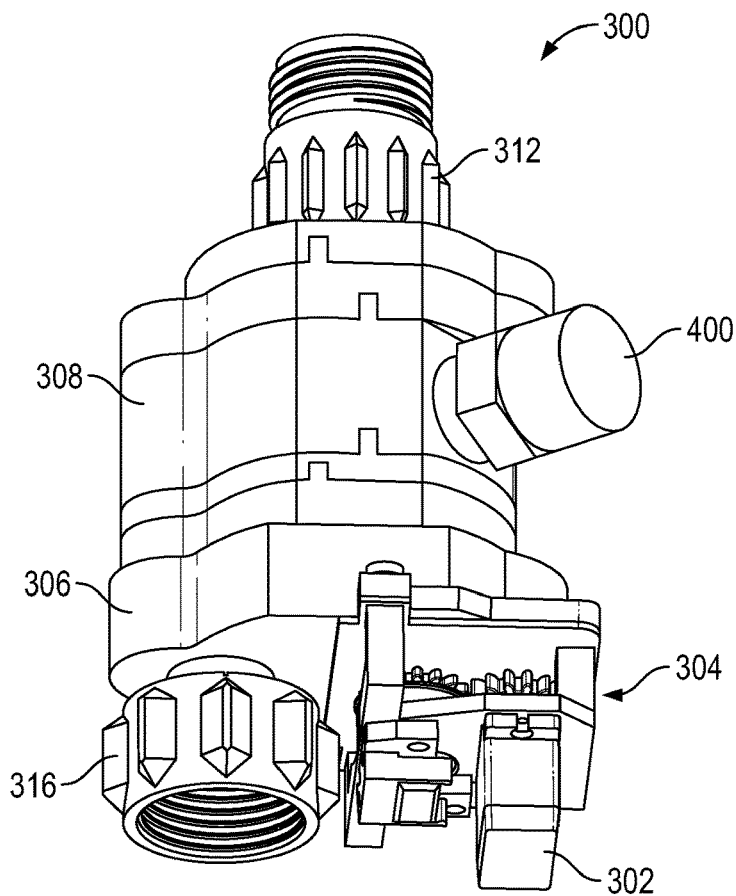
FIG. 18 is a bottom perspective view thereof showing the external drive components of the magnetic coupling system.

FIGS. 16-18 shows various views of entire oscillator/diverter 300 for reference including a transparent elevation view.

The input to the assembly, as shown, is a standard threaded garden hose connector 316, although it could be any suitable connector or integrated directly into a common housing downstream of the pressure control valve. This is the supply pressure. Varying this pressure with the pressure control valve 200 affects the output pressure of nozzle 14 and, thus, the distance of the water sprayed from the nozzle 14. Varying the supply pressure will also affect the speed of the water powered motor and a minimum pressure must be supplied for the motor to turn.

The flow of water initially passes into a diverter chamber 318 through an input port 320 and is directed through one of two exit ports 322, 324 in a boundary wall 326 between the diverter chamber 318 and a turbine chamber 328 in the oscillator drive portion 308. The water flows across and rotates the turbine wheel 314 (assuming the diverter is not in the idle position). The water then flows through another boundary wall 330 into an oscillator chamber 332 containing a gear train 334. The nozzle (not shown) is mounted to the neck 312.

There is also a pressure relief valve 338 that provides an alternative path directly from the diverter chamber 318 to the neck 312 for water at excessive supply pressures that might, otherwise, overwhelm the diverter/oscillator 300. The pressure relief valve 338 essentially acts as a rotation speed limiter without restricting nozzle pressure. Note that restricting the nozzle pressure would restrict the maximum distance of the spray pattern.

The sprinkler head gear 336 also drives a rotational sensor gear 340, which captures a diametric permanent magnet in line with a magnetic rotational sensor 500 located external to the oscillator/diverter assembly 300. The gear 340 has a 1:1 ratio with the head gear 336, making it possible to electronically determine the corresponding angle of rotation of the nozzle 14. The oscillator gear train 334, head gear 336, sensor gear 340 and pressure relief valve 338 are all rotatably captured within the oscillator chamber 332, which is pressurized at the output (nozzle) pressure. The electronic pressure sensor 400 is embedded in the side wall of the oscillator chamber 332 and provides a means of electronically determining the nozzle pressure in real time. Note that the shaft 310 of neck 312 is the only component of the oscillator/diverter assembly 300 that penetrates a water chamber to atmosphere with a rotating component and, therefore, requires a seal; supplied here by an O-ring 344. Other than the supply input 320 and the shaft 310, the entire device is hermetically sealed. The friction introduced by the O-ring seal 344 is easily overcome by the torque produced by the gear ratio (approximately 500:1) of the oscillator drive train 334.

Figure 19:
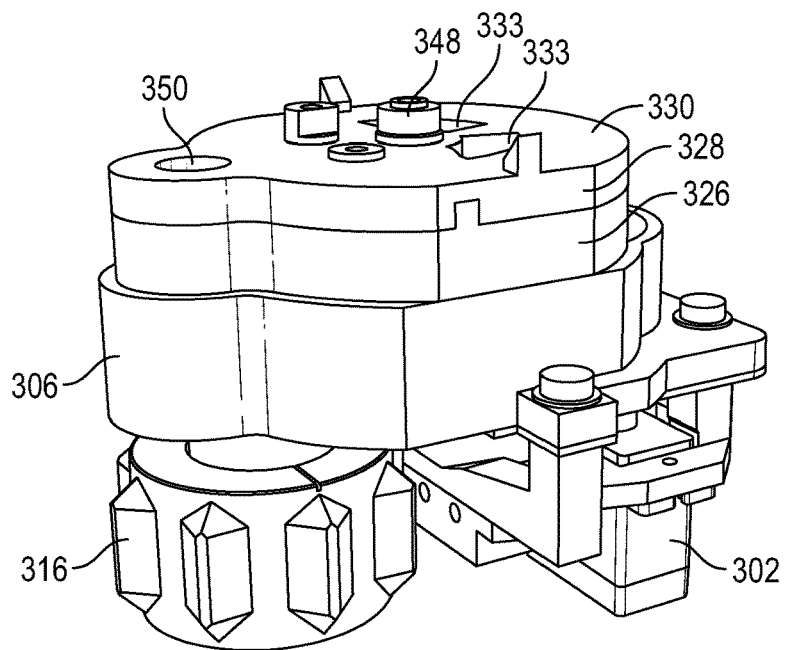
FIG. 19 is a perspective view of the diverter assembly.
Figure 20:
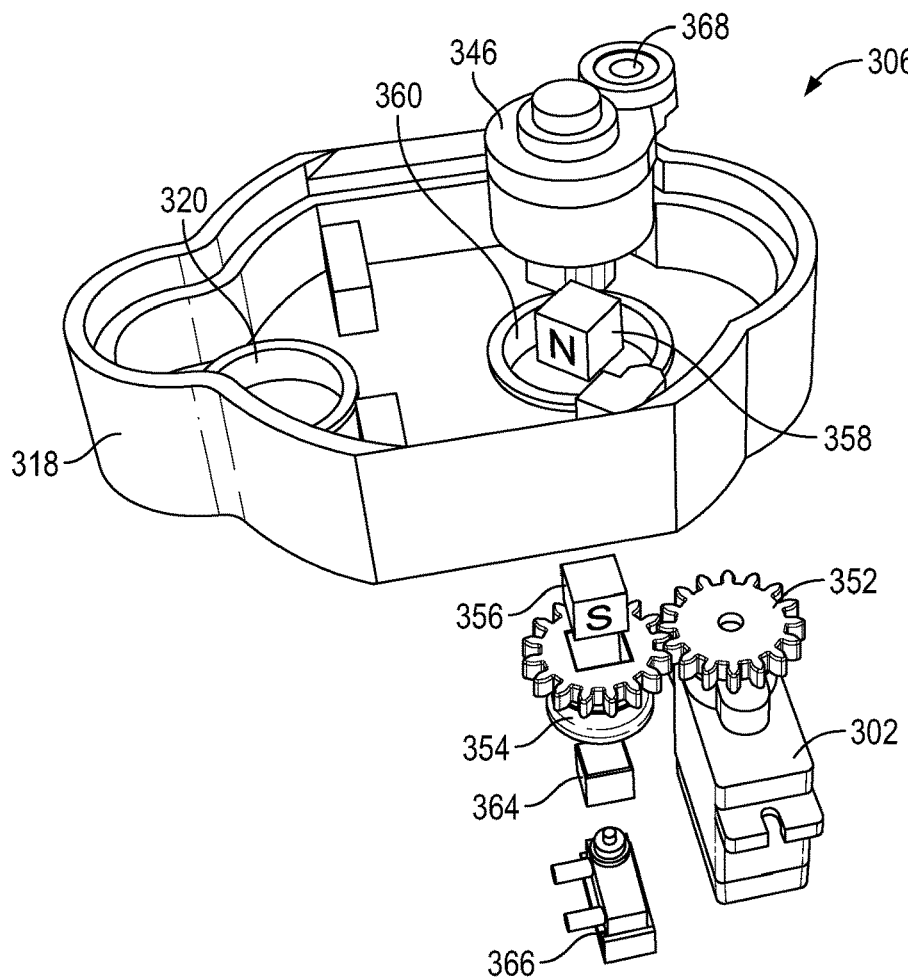
FIG. 20 is an exploded perspective view of the diverter control magnetic coupling input.

FIGS. 18-20 show external views of the diverter components. The motor 302 of the external portion of the magnetic coupling 304 is used to drive the mechanism. The external rotation is transferred to the internal portion of the assembly, which includes an armature 346 that diverts the water flow through one of two ports 322, 324 into the turbine chamber 328.

The input water flow is through input port 320. This supplies water under pressure to the diverter chamber 318. The control input is via the external components of the magnetic coupling 304, which changes the position of the armature 346 (FIGS. 20-23) inside the diverter chamber 318. The position of the armature 346 determines which port 322, 324 the water flows through into the turbine chamber 328. As the water flows across the turbine wheel 314 the water continues to flow through the boundary wall 330 into the oscillator chamber 332 via ports 333. The turbine 314 rotates and provides the mechanical input to the gear train 334 via a small drive gear 348. A relief valve port 350 further allows excess pressure to release water through to the sprinkler neck 312, limiting the speed of the turbine 314.

Figure 21:
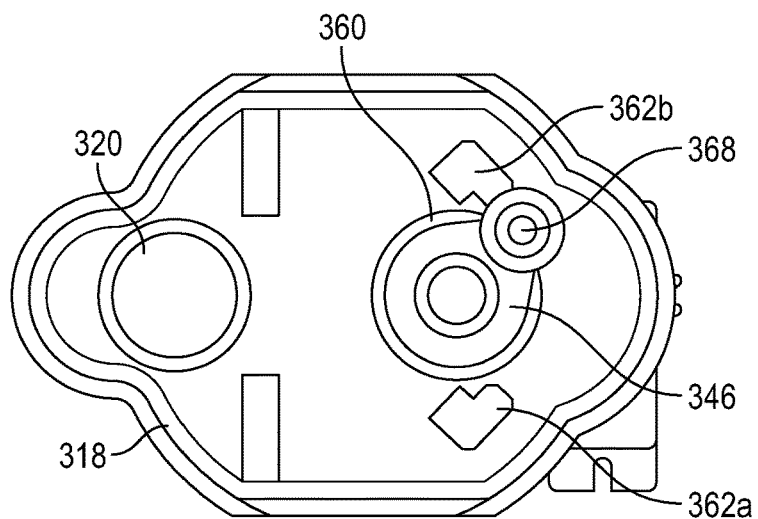
FIG. 21 is a top view of the diverter control.

FIGS. 20-21 shows the control input into the diverter armature 346. The motor gear 352 drives the magnet gear 354, which has a square hole that captures the external magnet 356. The external magnet 356 is magnetically coupled to the internal magnet 358 across the boundary wall of the diverter chamber 318. The diverter boundary wall has a round well 360 incorporated into it that captures the armature 346. As the external magnet 356 is rotated, the internal magnet 358 is rotated accordingly. Since it is captured in a square socket in the armature 346, the armature 346 is also rotated in correspondence with the magnetic coupling. When the magnets 356, 358 are in phase, the north and south pole of the external magnet 356 is aligned with the south and north poles of the internal magnet 358. In this relative position, the magnetic force vector is entirely normal to the boundary and the magnets are attracted to each other. As the motor gear 352 continues to rotate, the armature 346 contacts one of the stops 362a, 362b, preventing any further rotation of the armature 346. As the external magnet 356 continues to rotate, the magnets become out of phase. When they are out of phase by 90 degrees, there is no longer a net magnetic force normal to the boundary, so the force vector is entirely rotational. As the external magnet 356 continues to rotate putting it greater than 90 degrees out of phase with the internal magnet 358, the magnets begin to repel each other. As described previously, the external magnet 356 is free to move normal to the boundary, so it is pushed away from the boundary and transfers the repulsive magnetic force through the magnet adapter 364 to the limit switch 366. At some point, when the phase angle is between 90 and 180 degrees, the force becomes strong enough to activate the limit switch 366, which is electronically detected. Upon the detection, the motor 302 is stopped and then reversed, which causes the phase angle to decrease. At some point, when the phase angle is less than 90 degrees, the magnetic force becomes attractive again and the magnet 356 moves back toward the diverter boundary, releasing the limit switch 366. Again, the deactivation of the limit switch 366 is detected electronically, and the motor 302 is stopped and locked. At this position, the phase angle is, generally, still greater than zero. In the figure, the external magnet 356 is shown to be 45 degrees out of phase with the internal magnet. In this state, the magnetic force vector is holding the armature 346 against the diverter boundary and against the stop 362, which is situated as to locate the armature plug 368 over one of the output ports 322, 324 to the turbine chamber 328.

Figure 22:
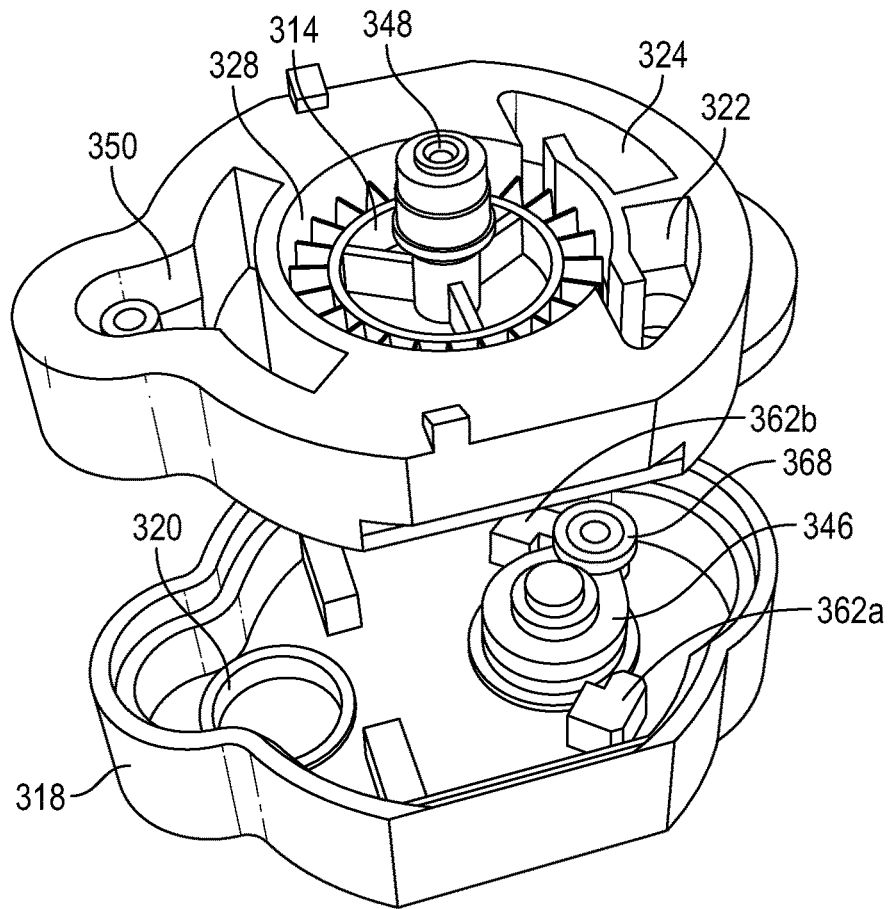
FIG. 22 is an exploded perspective view of the turbine chamber in position above the output of the diverter.
Figure 23:
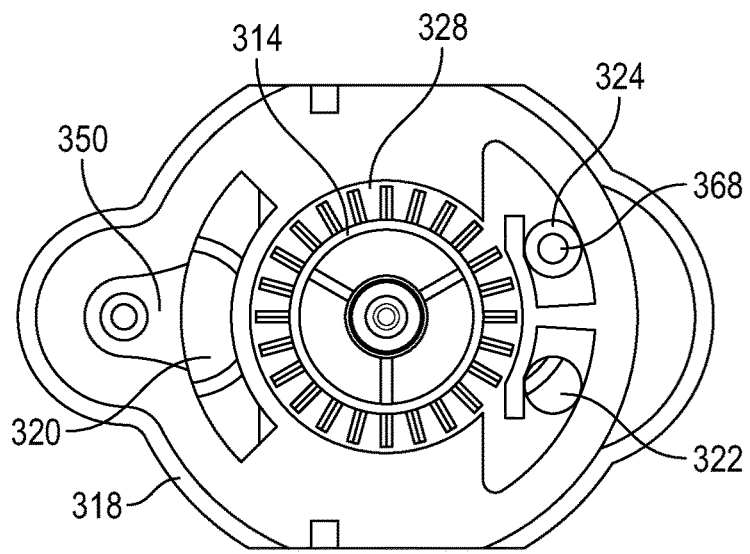
FIG. 23 is a top view thereof showing the relationship of the diverter armature and the flow ports of the oscillator chamber.

FIGS. 21-23 show the armature 346 being held in position against a stop 362, which holds the armature plug 368 in line with one of the ports 322, 324 (blocking the port) into the turbine chamber 328. Blocking one port causes the water to flow into the opposite port. The pressurized water is directed onto the blades of the turbine 314 through the corresponding port outlet. In this figure, the turbine 314 would rotate counter-clockwise, as viewed from above. Rotating the armature 346 to the opposite stop would cause the plug 368 to block the opposite port, which would cause water to flow through the other port and the turbine 314 would rotate in the clockwise direction. It is this mechanism that allows the rotation direction of the oscillator to be controlled electronically. Note that it is possible to turn the motor 302 so that the armature 346 is in a position midway between the ports (position not shown). In this state, the water flows equally between the two ports 322, 324 and the net pressure at the two port outlets is approximately the same and the turbine 314 does not rotate. One exemplary method of achieving this state is by measuring the time it takes to drive the motor 302 from one stopped position to the other and then by rotating the motor 302 from one stopped position toward the other for half of that duration. Thus, the control is able to effect three states: rotation clockwise, rotation counter-clockwise and stationary. Other possible methods include the use of artificial intelligence (AI) learning algorithms which learn and adjust motor timing. AI type learning algorithms are effective for this type of implementation because of the unpredictable nature of water in mechanical systems.

Another benefit to the present smart sprinkler arrangement is that the sprinkler system will never get stuck due to low water pressure. One problem with purely mechanical sprinklers is that they require a minimum water pressure to operate. There is friction in the water motor mechanism, so you have to turn up the water pressure to some minimum amount to overcome that or it won't rotate. It can even be hard to predict because that point can be a little different along the rotation. Also, the mechanical actuator for changing direction requires an even greater pressure to overcome the force involved in moving the actuator. Moreover, the supply pressure can change, so that a drop in pressure can cause a sprinkler to stop rotating even if it was when it was set up.

The present system has the same problem with friction of the water powered motor 308. Some minimum is required for rotation of the turbine wheel 314 to occur. With the present sprinkler system 10, the point of direction change is detected by a sensor and the change of direction is accomplished via an electric motor. Neither introduces additional friction or requires water pressure. In addition, it can detect whether the sprinkler head is rotating (rotational sensor gear 340) and can automatically raise the pressure (valve 200) until it starts rotating. It also raises the pressure automatically if the supply pressure drops due to outside factor (local water demand). This means that the sprinkler 10 will not get stuck. In fact, there really is no minimum pressure. The system will lower the pressure to a user set point and then automatically raise it enough to rotate the sprinkler head 14. Once rotation is detected, it will again lower the pressure to the user set point. The system won't generate a simple arc in this mode, as it would with a higher pressure, but it will apply water at the set range, and it won't get stuck. Note that this assumes that the supply pressure is greater than the minimum required pressure. If this is not satisfied, the sprinkler can detect the condition and shut itself off completely, abandoning the user pattern until such time as the supply pressure is restored. Similarly, if a water pattern was configured that includes a maximum water pressure that cannot be achieved at the time of running the pattern, the sprinkler can automatically skip over those portions of the pattern that cannot be achieved and still execute the portions of the pattern that can. Thus, the sprinkler can come as close to satisfying the desires of the user as is possible.

Accordingly, it can be seen that the present system 10 provides several unique and novel improvements over systems of the prior art, particularly with respect to sealed chamber magnetic couplers and switching mechanism which eliminate the need for high friction seals for rotating parts and which also reduce power needs for rotating components within the sealed chambers.

Having thus described certain particular embodiments of the invention, it is understood that the invention defined by the appended claims is not to be limited by particular details set forth in the above description, as many apparent variations thereof are contemplated. Rather, the invention is limited only by the appended claims, which include within their scope all equivalent devices or methods which operate according to the principles of the invention as described.

What is claimed is:

1. A magnetic coupling assembly comprising:
   a sealed chamber having a chamber wall;
   an internal body rotatably mounted within said sealed chamber, said internal body having an axis of rotation aligned normal to said chamber wall;
   an internal magnet received in said internal body on said axis of rotation;
   an external coupling body rotatably mounted on an exterior surface of said chamber wall, said external coupling body having an axis of rotation aligned normal to said chamber wall and coaxial with said axis of rotation of said internal body;
   an external magnet received in a socket in said external coupling body on said axis of rotation;
   said internal and external magnet having north and south poles aligned parallel to the chamber wall and in phase with each other; and
   wherein said internal magnet is magnetically coupled to said external magnet and said internal magnet and internal body are correspondingly rotated by rotation of said external coupling body and external magnet,
   said external magnet being slidably movable within said socket of said external coupling body along said axis of rotation,
   wherein said external magnet is repulsed by said internal magnet and slidably moves within said socket when said internal body and said internal magnet are prevented from rotating and said external coupling body continues to rotate, forcing said external magnet out of phase with said internal magnet and creating a repulsive force pushing said external magnet away from said chamber wall.

2. The magnetic coupling assembly of claim 1 further comprising a sensor configured and arranged to sense an end of rotation of said internal body within said sealed chamber.

3. The magnetic coupling assembly of claim 2 wherein said sensor comprises a mechanical switch which cooperates with said external coupling body.

4. A magnetic coupling assembly comprising:
   a sealed chamber having a chamber wall;

an internal body rotatably mounted within said sealed chamber, said internal body having an axis of rotation aligned normal to said chamber wall;

an internal magnet received in said internal body on said axis of rotation;

an external coupling body rotatably mounted on an exterior surface of said chamber wall, said external coupling body having an axis of rotation aligned normal to said chamber wall and coaxial with said axis of rotation of said internal body;

an external magnet received in a socket in said external coupling body on said axis of rotation;

said internal and external magnet having north and south poles aligned parallel to the chamber wall and in phase with each other; and a reversible motor driving rotation of said external coupling body, wherein said internal magnet is magnetically coupled to said external magnet and said internal magnet and internal body are correspondingly rotated by rotation of said external coupling body and external magnet said external magnet being slidably movable within said socket of said external coupling body along said axis of rotation, wherein said external magnet is repulsed by said internal magnet and slidably moves within said socket when said internal body and said internal magnet are prevented from rotating and said external coupling body continues to rotate, forcing said external magnet out of phase with said internal magnet and creating a repulsive force pushing said external magnet away from said chamber wall.

5. The magnetic coupling assembly of claim 4 further comprising a sensor configured and arranged to sense an end of rotation of said internal body within said sealed chamber.

6. The magnetic coupling assembly of claim 5 wherein said sensor comprises a mechanical switch which cooperates with said external coupling body.

7. A magnetic coupling assembly comprising:

a sealed chamber having a chamber wall;

an armature rotatably mounted within said sealed chamber, said armature having an axis of rotation aligned normal to said chamber wall;

opposing armature stops within said sealed chamber, said armature being rotatable between said opposing armature stops;

an internal magnet received in said armature on said axis of rotation;

an external coupling body rotatably mounted on an exterior surface of said chamber wall, said external coupling body having an axis of rotation aligned normal to said chamber wall and coaxial with said axis of rotation of said armature;

an external magnet received in a socket in said external coupling body on said axis of rotation;

said internal and external magnet having north and south poles aligned parallel to the chamber wall and in phase with each other; and a reversible motor driving rotation of said external coupling body, wherein said internal magnet is magnetically coupled to said external magnet and said internal magnet and armature are correspondingly rotated by rotation of said external coupling body and external magnet said external magnet being slidably movable within said socket of said coupling body along said axis of rotation, wherein said external magnet is repulsed by said internal magnet and slidably moves within said socket when said armature engages one of said armature stops preventing further rotation of said armature and said internal magnet and said external coupling body continues to rotate, forcing said external magnet out of phase with said internal magnet and creating a repulsive force pushing said external magnet away from said chamber wall.

8. The magnetic coupling assembly of claim 7 further comprising a sensor configured and arranged to sense an end of rotation of said armature within said sealed chamber.

9. The magnetic coupling assembly of claim 8 wherein said sensor comprises a mechanical switch which cooperates with said external coupling body.

10. The magnetic coupling assembly of claim 9 wherein said mechanical switch is a limit switch mounted on said axis of rotation of said external coupling body adjacent to said external magnet, and wherein said external magnet slidably moves within said socket into engagement with said limit switch when said armature engages one of said armature stops.

11. The magnetic coupling assembly of claim 7 wherein said external coupling body comprises a coupling gear and further comprising a motor gear engaged with said coupling gear for driving rotation of said coupling gear.

12. The magnetic coupling assembly of claim 10 wherein said external coupling body comprises a coupling gear and further comprising a motor gear engaged with said coupling gear for driving rotation of said coupling gear.

13. The magnetic coupling assembly of claim 7 wherein the armature is rotatably supported in a well within said chamber wall.

14. The magnetic coupling assembly of claim 7 wherein said internal and external magnets are square.

15. The magnetic coupling assembly of claim 10 wherein said internal and external magnets are square.

16. The magnetic coupling assembly of claim 7 further comprising a mechanical limit switch mounted on said axis of rotation of said external coupling body adjacent to said external magnet, wherein said external magnet is repulsed by said internal magnet and slidably moves within said socket into engagement with said limit switch.

17. The magnetic coupling assembly of claim 16 wherein said external coupling body comprises a coupling gear and further comprising a motor gear engaged with said coupling gear for driving rotation of said coupling gear.

18. The magnetic coupling assembly of claim 16 wherein said internal and external magnets are square.

19. The magnetic coupling assembly of claim 17 wherein said internal and external magnets are square.

* * * * *